United States Patent
Wang et al.

(10) Patent No.: US 8,819,225 B2
(45) Date of Patent: Aug. 26, 2014

(54) HARDWARE-ASSISTED INTEGRITY MONITOR

(75) Inventors: Jiang Wang, Fairfax, VA (US); Angelos Stavrou, Springfield, VA (US); Anup Ghosh, Centreville, VA (US); Kun Sun, Fairfax, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 0 days.

(21) Appl. No.: 13/296,312

(22) Filed: Nov. 15, 2011

(65) Prior Publication Data

US 2012/0297057 A1     Nov. 22, 2012

Related U.S. Application Data

(60) Provisional application No. 61/413,673, filed on Nov. 15, 2010.

(51) Int. Cl.
*G06F 15/173*    (2006.01)
*G06F 11/00*    (2006.01)

(52) U.S. Cl.
USPC ............................................ 709/224; 726/22

(58) Field of Classification Search
USPC ....................................................... 709/224
See application file for complete search history.

(56) References Cited

U.S. PATENT DOCUMENTS

| | | | | | |
|---|---|---|---|---|---|
| 4,926,322 | A | * | 5/1990 | Stimac et al. | 703/23 |
| 5,339,437 | A | * | 8/1994 | Yuen | 710/261 |
| 5,564,015 | A | * | 10/1996 | Bunnell | 714/47.2 |
| 5,850,562 | A | * | 12/1998 | Crump et al. | 713/1 |
| 5,974,573 | A | * | 10/1999 | Martin | 714/48 |
| 6,629,157 | B1 | * | 9/2003 | Falardeau et al. | 710/10 |
| 7,278,168 | B1 | * | 10/2007 | Chaudhury et al. | 726/30 |
| 7,380,136 | B2 | * | 5/2008 | Zimmer et al. | 713/193 |
| 7,539,986 | B2 | * | 5/2009 | Grobman | 718/1 |
| 7,610,426 | B1 | * | 10/2009 | Dunn | 710/267 |
| 7,730,248 | B2 | * | 6/2010 | Goss et al. | 710/261 |
| 7,822,979 | B2 | * | 10/2010 | Mittal | 713/164 |
| 7,925,815 | B1 | * | 4/2011 | Dunn | 710/316 |
| 8,285,999 | B1 | * | 10/2012 | Ghose et al. | 713/176 |
| 8,347,290 | B2 | * | 1/2013 | Srinivasan | 718/100 |

(Continued)

OTHER PUBLICATIONS

Brassard, Gilles. (1983). On Computationally Secure Authentication Tags Requiring Short Secret Shared Keys. Advances in Cryptology {Crypto '82 Proceedings, Springer-Verlag. pp. 79-86.*

(Continued)

*Primary Examiner* — Lynn Feild
*Assistant Examiner* — Timothy Sowa

(57) ABSTRACT

A hardware-assisted integrity monitor may include one or more target machines and/or monitor machines. A target machine may include one or more processors, which may include one or more system management modes (SMM). A SMM may include one or more register checking modules, which may be configured to determine one or more current CPU register states. A SMM may include one or more acquiring modules, which may be configured to determine one or more current memory states. A SMM may include one or more network modules, which may be configured to direct one or more communications, for example of one or more current CPU register states and/or current memory states, to a monitor machine. A monitor machine may include one or more network modules and/or analysis modules. An analysis module may be configured to determine memory state differences and/or determine CPU register states differences.

21 Claims, 11 Drawing Sheets

(56) References Cited

U.S. PATENT DOCUMENTS

| | | | | |
|---|---|---|---|---|
| 2003/0005247 | A1* | 1/2003 | Chang | 711/163 |
| 2005/0210467 | A1* | 9/2005 | Zimmer et al. | 718/1 |
| 2005/0289311 | A1* | 12/2005 | Durham et al. | 711/163 |
| 2006/0004982 | A1* | 1/2006 | Matheny | 711/202 |
| 2006/0212520 | A1* | 9/2006 | Logue et al. | 709/206 |
| 2008/0229159 | A1* | 9/2008 | Viljoen | 714/57 |
| 2009/0125716 | A1* | 5/2009 | Wooten | 713/164 |
| 2009/0328042 | A1* | 12/2009 | Khosravi et al. | 718/100 |
| 2010/0031360 | A1* | 2/2010 | Seshadri et al. | 726/24 |
| 2010/0057982 | A1* | 3/2010 | Barde | 711/104 |
| 2010/0281273 | A1* | 11/2010 | Lee et al. | 713/190 |
| 2010/0299665 | A1* | 11/2010 | Adams | 718/1 |
| 2011/0055469 | A1* | 3/2011 | Natu et al. | 711/105 |
| 2011/0078408 | A1* | 3/2011 | Ishida et al. | 711/216 |
| 2011/0167195 | A1* | 7/2011 | Scales et al. | 711/6 |
| 2012/0198514 | A1* | 8/2012 | McCune et al. | 726/1 |

OTHER PUBLICATIONS

Rutkowska, Joanna, et al. (Aug. 7, 2008). Preventing and Detecting Xen Hypervisor Subversions. Blackhat Briefings USA, 119 pp.*

Petroni, Nick, et al. (Aug. 9, 2004). Copilot—a Coprocessor-based Kernel Runtime Integrity Monitor. Proceedings of the 13th USENIX Security Symposium (vol. 6, No. 3). San Diego, CA, USA: USENIX Press. 17 pp.*

Wang, Jiang, et al. (2011) An Analysis of System Management Mode (SMM)-based Integrity Checking Systems and Evasion Attacks. George Mason University Department of Computer Science Technical Report. 13 pp.*

Shipman, Matt, et al. (Sep. 21, 2010) New Research Improves Ability to Detect Malware in Cloud-Computing Systems. North Carolina State University Press Release. 3 pp. Retrieved from http://news.ncsu.edu/releases/wmsninghypersentry/.*

Azab, Ahmed, et al. (Oct. 4, 2010) HyperSentry: Enabling Stealthy In-context Measurement of Hypervisor Integrity. Proceedings of the 17th ACM Conference on Computer & Communications Security. ACM. pp. 38-49.*

Ning, Peng. (Nov. 21, 2010) CSC/ECE 774 Advanced Network Security Topic 7.2 Infrastructure Security for Virtual Cloud Computing. North Carolina State University Department of Computer Science. 14 pp. Retrieved from http://discovery.csc.ncsu.edu/Courses/csc774-F10/slides/T07.2__CCInfrasSec.pptx.pdf.*

Rutkowska, Joanna, et al. (Aug. 7, 2008) Bluepilling the Xen Hypervisor. Blackhat Briefings USA, 85 pp.*

* cited by examiner

| System | Symbol | Use |
|---|---|---|
| Xen | idt_table | Hypervisor's Interrupt Descriptor Table |
| | hypercall_table | Hypervisor's Hypercall Table |
| | exception_table | Hypervisor's Exception Table |
| | _stext | Beginning of hypervisor code |
| | _etext | End of hypervisor code |
| Dom0 | sys_call_table | Domain 0's System Call Table |
| | _text | Beginning of Domain 0's kernel code |
| | _etext | End of Domain 0's kernel code |
| Linux | idt_table | Kernel's Interrupt Descriptor Table |
| | sys_call_table | Kernel's System Call Table |
| | _text | Beginning of kernel code |
| | _etext | End of kernel code |
| Windows | PCR→idt | Kernel's Interrupt Descriptor Table |
| | KiServiceTable | Kernel's System Call Table |

FIG. 3

| Code base | Size(MB) | Execution Time(ms) | | |
|---|---|---|---|---|
| | | HC | SMM | TPM |
| Linux | 2.0 | 31 | 203 | 1022 |
| Xen+Dom0 | 2.7 | 40 | 274 | >1022 |
| Windows XP | 1.8 | 28 | 183 | >972 |
| Hyper-V | 2.4 | 36 | 244 | >1022 |
| VMWare ESXi | 2.2 | 33 | 223 | >1022 |

Comparision between HyperCheck and other methods

|  | Memory | Registers | Overhead |
| --- | --- | --- | --- |
| HyperCheck | X | X | Low |
| SMM | X | X | High |
| PCI | X |  | Low |
| TPM | X | X | High |

FIG. 9

HARDWARE-ASSISTED INTEGRITY MONITOR

CROSS-REFERENCE TO RELATED APPLICATIONS

This application claims the benefit of U.S. Provisional Application No. 61/413,673, filed Nov. 15, 2010, entitled "HyperCheck: A Hardware-Assisted Integrity Monitor," which is hereby incorporated by reference in its entirety.

STATEMENT REGARDING FEDERALLY SPONSORED RESEARCH OR DEVELOPMENT

This invention was made with government support under grant number FA 8650-09-C-7965 funded by the Defense Advanced Research Projects Agency, grant number FA 9550-07-1-0527 funded by the Air Force Office of Scientific Research, and grant number CNS-TC 0915291 funded by the National Science Foundation. The government has certain rights in the invention.

BACKGROUND

Over the past few years, virtualization may have been employed in a variety of environments. Such environments may vary, ranging from relatively densely populated cloud-computing clusters to home desktop computers. As a result, Virtual Machine Monitors (VMMs) may have been embraced as a new mechanism to provide isolation of untrusted software components. Unfortunately, widespread adoption of VMMs may have promoted VMMs as a target for attack. Furthermore, an attacker may exploit vulnerabilities in any software running in a machine after bootup, including VMM and all of its privileged components. Therefore, there may be a need for apparatuses and/or processes that protect the integrity of computing networks, devices, VMMs and/or Operating Systems (OSes).

BRIEF DESCRIPTION OF THE SEVERAL VIEWS OF THE DRAWINGS

Example

Example

Example FIG. 3 illustrates a table showing symbols that may be employed in accordance with some aspects of embodiments.

Example

Example

Example

Example

Example

Example FIG. 9 illustrates a table showing a comparison between a hardware-assisted integrity monitor and related approaches in accordance with some aspects of embodiments.

Example

Example

Example

Example

DETAILED DESCRIPTION OF EMBODIMENTS

Figure 1:
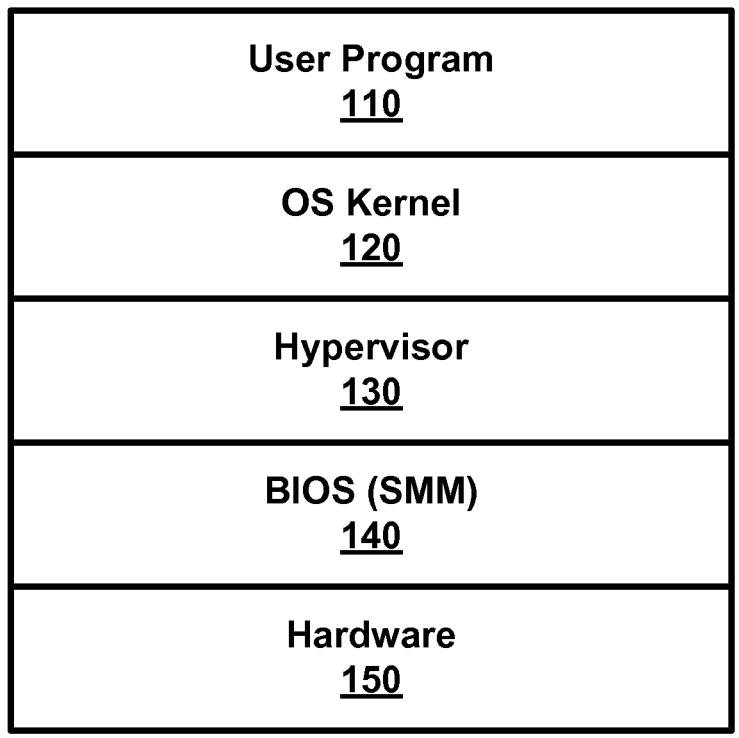
FIG. 1 illustrates a hardware-assisted integrity monitor configured to operate at the Basic Input/Output System (BIOS) level in accordance with some aspects of embodiments.

According to some aspects of embodiments, a hardware-assisted integrity monitor may be configured to protect the integrity of one or more VMMs and/or OSes. Integrity may be a concern, for example where an attacker may compromise a guest domain and/or escape to a privileged domain. In one example related to Xen 3.0.3, pygrub may allow local users with elevated privileges in the guest domain (Domain U) to execute arbitrary commands in Domain 0 via a grub.conf file. In another example, an attacker may modify hypervisor code and/or data using a zero-day attack. A DMA attack may hijack a device driver to perform unauthorized DMA to a hypervisor's code and/or data. In one aspect of embodiments, attacks on computer networks, devices, VMMs and/or OSes may be detected, isolated and/or removed. In another aspect of embodiments, attacks that aim to disable and/or block the operation of a hardware-assisted integrity monitor may be detected, isolated and/or removed.

According to some aspects of embodiments, attacks which may be detected, isolated and/or removed may include one or more software rootkits. A rootkit may include a set of programs and/or code that may allow a permanent and/or consistent undetectable presence on a computer. A rootkit may modify memory and/or registers, and/or may run in the kernel level. A rootkit may target the integrity of hypervisors (e.g., Xen hypervisor) and/or OSes. The idt-hook rootkit, for example, may modify the Interrupt Descriptor Table (IDT) in the memory and/or gain control of the complete system. A stealthier version of an idt-hook rootkit may keep the original IDT unchanged, for example by copying it to a new location and altering it. An attacker may change an IDTR register to point to a new location. In a hypervisor level rootkit, there may be another kernel: the hypervisor kernel that may run underneath the operating system kernel.

According to some aspects of embodiments, a hardware-assisted integrity monitor may detect anomalies, which may lead to identification of a relatively larger class of rootkits. In one aspect of embodiments, a hardware assisted integrity monitor may detect in-memory, Ring-0 level (hypervisor and/or general OS) rootkits and/or rootkits in privileged domains of hypervisors. In another aspect of embodiments, a hardware assisted integrity monitor may ferret-out rootkits, for example aimed at Xen hypervisor, Xen Domain 0, Linux, Windows, and/or the like.

According to some aspects of embodiments, a hardware-assisted integrity monitor may be configured to operate at a Basic Input/Output System (BIOS) level. Referring to example FIG. 1, a hardware-assisted integrity monitor may be configured to operate at BIOS level 140. In one aspect of embodiments, a hardware-assisted integrity monitor may be configured to protect and/or monitor software above it, for example a hypervisor configured to operate at hypervisor level 130, an operating system kernel configured to operate at OS kernal level 120, a computer program configured to operate at user program level 110, and/or the like. In another aspect of embodiments, a hardware-assisted integrity monitor may leverage a CPU System Management Mode (SMM).

As illustrated in one aspect of embodiments in FIG. 1, a hardware-assisted integrity monitor configured to operate at BIOS level 140 may leverage a SMM. SMM was introduced in the Intel386 SL and Intel486 SL processors, and became a standard IA-32 feature in the Pentium processor. In some aspects of embodiments, SMM may be a separate CPU mode relative to the protected and/or real mode, and/or may provide a transparent mechanism for implementing platform specific functions such as power management and/or system security. In one aspect of embodiments, one or more processors may enter SMM when an external SMM interrupt pin (e.g., SMI#) is activated and/or when a SMI is received from an Advanced Programmable Interrupt Controller (APIC).

According to some aspects of embodiments, one or more processors may switch to a separate address space in SMM, for example System Management RAM (SMRAM). In one aspect of embodiments, substantially all the hardware context of currently running code may be saved in SMRAM. In another aspect of embodiments, one or more processors in SMM may transparently execute one or more instructions, which may be a part of BIOS and/or reside in SMRAM. SMRAM may be made inaccessible from other CPU operating modes.

According to some aspects of embodiments, SMRAM may be configured to operate as trusted storage, for example sealed from access by any device and/or CPU (e.g., while not in SMM mode). In one aspect of embodiments, one or more SMM instructions may be modified to execute one or more monitoring functions. In another aspect of embodiments, a modification of SMM instructions may be integrated into a BIOS. In further aspects of embodiments, a trust boot mechanism and/or a management interface may be employed to upload one or more instruction to SMM (e.g., when SMRAM is not locked) and/or lock the SMRAM. In other aspects of embodiments, one or more processors may be placed back into its state prior to entering SMM, for example when returning from SMM.

According to some aspects of embodiments, a hardware-assisted integrity monitor may securely generate and/or transmit the state of a protected machine. In some aspects of embodiments, the state of a protected machine may include a substantially full state of a protected machine. In one aspect of embodiments, the state of a machine may be transmitted to a server, for example an external server relative to the protected machine. In another aspect of embodiments, one or more processor SMM, which may be present in substantially all x86 commodity systems, may be employed to create a snapshot view of the current state of one or more CPU's and/or memory registers of one or more protected machines. In further aspects of embodiments, snapshot information may be securely and/or verifiably transmitted to an analysis server, for example one or more external analysis servers.

According to some aspects of embodiments, one or more analysis servers may identify tampering, for example by comparing one or more newly generated views with the one or more preexisting views (e.g., recorded views). One or more recorded views may be obtained at any time, for example when a protected machine is initialized. In some aspects of embodiments, one or more scans of the state of one or more protected machines and/or software may be generated and/or communicated in a relatively quick timeframe, for example less than approximately 40 ms. In another aspect of embodiments, there may be no substantial prohibitive performance overhead, for example completely transmitting a snapshot in a few milliseconds. In further aspects of embodiments, an operator may be notified when views do not match. An operator may include a network administrator and/or a management platform, for example HP OpenView, Computer Associates Unicenter, and SUN Solstice.

According to some aspects of embodiments, snapshot information may be securely and/or verifiably communicated employing a network module, for example to an analysis server. In some aspects of embodiments, snapshot information may include a substantially complete view of a target machine's state (e.g., the entire memory and CPU registers). In one aspect of embodiments, a substantially complete snapshot of the state of a system may be created by employing commercially available hardware and/or substantially no modification to the installed software.

According to some aspects of embodiments, QEMU—a full system emulator—may be employed to operate one or more Peripheral Component Interconnect (PCI) Network Interface Cards (NICs). In one aspect of embodiments, a physical NIC may be employed, for example an Intel e1000 physical NIC. In another aspects of embodiments, specialized hardware may not be required to employ a hardware-assisted integrity monitor. In further aspects of embodiments, a hardware-assisted integrity monitor may employ one or more out-of-the-box network cards. Referring back to FIG. 1, a hardware-assisted integrity monitor may securely generate and/or transmit a state of a protected machine employing hardware configured to operate at hardware level 150.

According to some aspects of embodiments, a substantially complete view of one or more CPU states, including its registers, may be provided. Views may be important to minimize copy-and-change attacks which may mislead a PCI card, for example to scan the wrong regions of memory and/or report erroneously (e.g., the system is not affected). In some aspects of embodiments, employing a network card may facilitate out sourcing analysis of one or more state snapshots. In one aspect of embodiments, the relative performance of a system may be maximized and/or busy time may be minimized, for example from seconds to milliseconds. In another aspect of embodiments, a relatively low performance overhead may be provided. In further aspects of embodiments, the code and/or data of a privileged domain and/or underlying OSes may be monitored. In other aspects of embodiments, a monitoring machine may be employed to detect DoS attacks to a SMM code.

According to some aspects of embodiments, an attacker may not tamper with, and/or replace, an installed PCI NIC with a malicious NIC using the same driver interface. In some aspects of embodiments, SMM code may be integrated with BIOS. In one aspect of embodiments, SMRAM may be properly setup by BIOS upon boot time. In another aspect of embodiments, SMM code may not be included in the BIOS and/or may be uploaded to the SMRAM during boot. In further aspects of embodiments, any suitable process may accomplish uploading, for example using trusted boot and/or using the management interface to bootstrap a computer. In other aspects of embodiments, a trusted bootstrap mechanism may be employed to initialize SMM code. In more aspects of embodiments, locked SMRAM may be included and/or provided, for example once it is properly set up, which may not be subverted by an attacker.

According to some aspects of embodiments, static Platform Configuration Registers (PCRs) may be employed to secure a booting process. In some aspects of embodiments, data may be transmitted, which may provide relatively lower overhead on a target machine and/or may not require legacy applications to be ported or DRTM. In one aspect of embodiments, one or more hypervisor states may be monitored from a lower level, which may offer complementarity to processes enhancing security, for example hypervisor-specific processes and/or processes running at the same level as a hypervisor by adding hooks and/or enforcing security policies between virtual machines. In another aspect of embodiments, the non-executable bit in CPUs and/or Address Space Layout Randomization (ASLR) may be leveraged to protect against attacks which may modify dynamic data, such as modification to dynamically generated function pointers and/or return-oriented attacks where control flow may be redirected to memory location controlled by an attacker. In further aspects of embodiments, the presence of malfeasance, which may attempt to interfere with VMM code and/or statically defined function pointer, may be detected.

According to some aspects of embodiments, kernel invariance may be discovered manually. In some aspects of embodiments, memory may be acquired and/or kernel invariance may be automatically derived directly and/or without modifications. In one aspect of embodiments, virtual addresses of symbols may be obtained through a symbol file, and/or physical addresses may be calculated through CPU registers. In another aspect of embodiments, an accurate view of the system memory may be obtained, even if an underlying OS and/or hypervisor is compromised and/or page tables are altered. In further aspects of embodiments, a meta-protection mechanism may be employed to guard the integrity of OS-level defenses. In other aspects of embodiments, SMM may be employed to offer enhanced integrity protection, for example by monitoring the state of hypervisors and/or operating systems.

According to some aspects of embodiments, an attacker may not have physical access to a target machine. In some aspects of embodiments, one or more SMM BIOS may be locked and/or may not be altered during run. In one aspect of embodiments, a trusted boot may not be required to initialize a hardware-assisted integrity monitor. In another aspect of embodiments, one or more machines equipped with trusted boot may substantially minimize attacks against a hardware-assisted integrity monitor that may simulate a hardware reset. In further aspects of embodiments, attacks aimed at disabling, blocking, and/or controlling PCI devices may be minimized.

1. Example Architecture Embodiments

Figure 2:
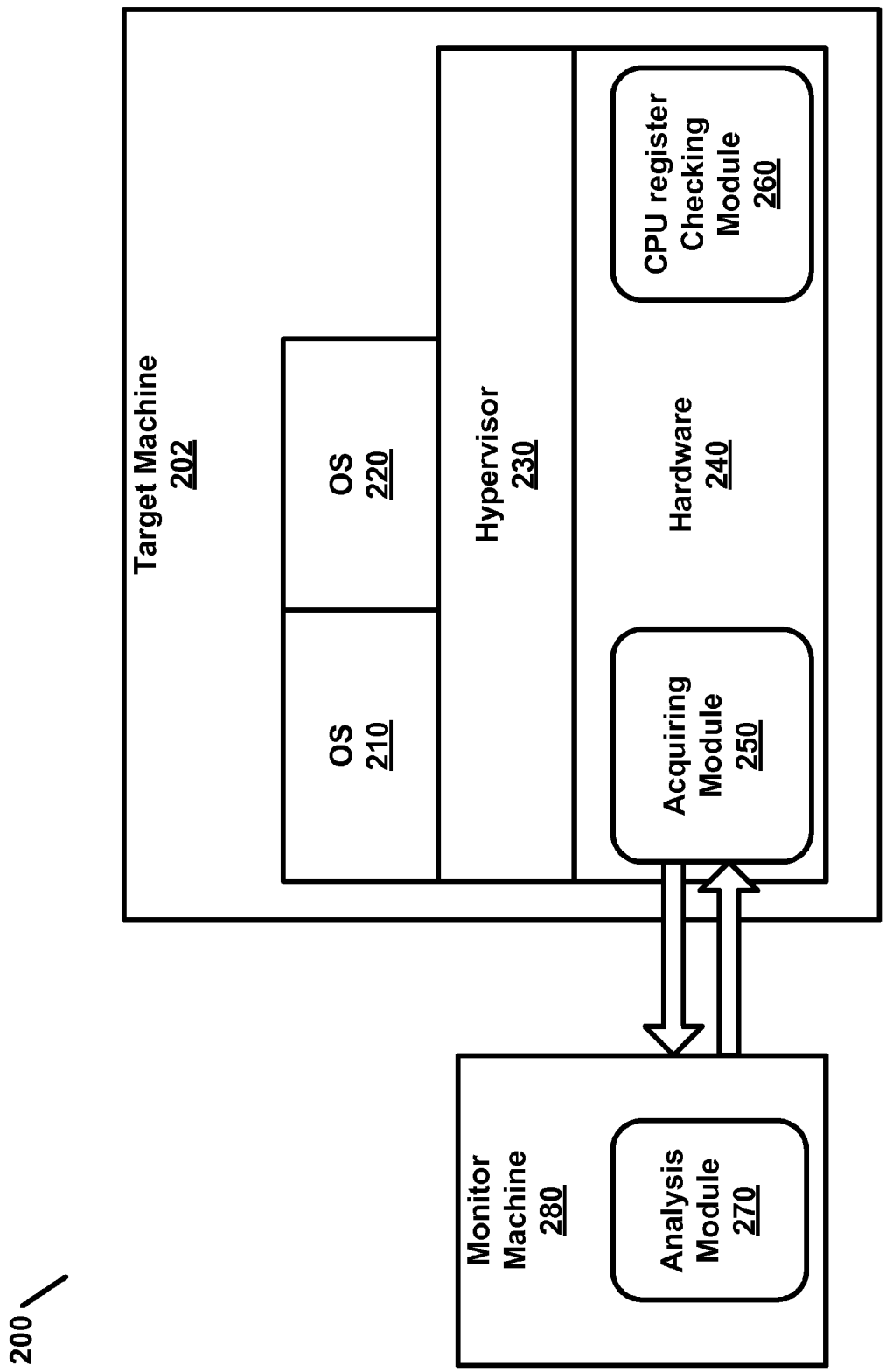
FIG. 2 illustrates a hardware-assisted integrity monitor in accordance with some aspects of embodiments.

Referring to Example FIG. 2, a hardware-assisted integrity monitor is illustrated in accordance with some aspects of embodiments. According to some aspects of embodiments, hardware-assisted integrity monitor 200 may include one or more acquiring modules 250, one or more register checking modules 260 and/or one or more analysis modules 270. In one aspect of embodiments, one or more memory acquiring modules 250 may read the contents of the physical memory of one or more target machines 202. In another aspect of embodiments, one or more CPU register checking modules 260 may be configured to read registers, and/or validate their integrity, for one or more target machines 202. In further aspects of embodiments, one or more analysis modules 270 may check memory and/or register content, and/or verify alterations.

According to some aspects of embodiments, a hardware-assisted integrity monitor may not rely on any software running on a machine, and/or may employ a boot loader. Since software may be compromised, operating system 210, operating system 220 and/or hypervisor 230 may not be trusted. In some aspects of embodiments, an acquiring module and/or register checking module may be configured to employ hardware 240. In one aspect of embodiments, acquiring module 250 may include and/or be integrated with a network module, for example a PCI NIC. In embodiments, a PCI device may include an Ethernet card, may include an enabled bus master mode, and/or may be configured to read physical memory, for example through DMA which may not need help from a CPU. In another aspect of embodiments, acquiring module 250 may allow the analysis of a state snapshot to be outsourced, for example by directing and/or employing a PCI NIC to communicate the state snapshot of target machine 202 to monitor machine 280.

According to some aspects of embodiments, instructions executed in an SMM mode may cause acquiring module 250 and/or CPU registering module 260 to perform a process, for example to read memory and/or CPU registers. In another aspect of embodiments, entering and/or exiting SMM mode may automatically cause acquiring module 250 and/or CPU registering module 260 to perform a process, for example to read memory and/or CPU registers.

According to some aspects of embodiments, SMM may be an independent operating mode and/or may be made inaccessible from protected mode, which is what a hypervisor and/or privileged domains may run in. CPU registers may be important in network analysis, since they may define the location of active memory used by the hypervisor and/or an OS kernel, for example CR3 and/or IDTR registers. Without such registers, an attacker may be able to launch a copy-and-change attack. An attacker may copy the memory to a new location and/or modify it. An attacker may update the register to point to the new location. PCI devices may not be configured to read the CPU registers, thereby failing to detect this kind of attacks. In some aspects of embodiments, a hardware-assisted integrity monitor may employ SMM to examine the registers and/or communicate modifications via a network module.

According to some aspects of embodiments, a hardware-assisted integrity monitor may employ registers, for example a CR3, to translate the virtual addresses used by the kernel to the physical addresses captured by an analysis module. In some aspects of embodiments, an acquiring module may employ the physical address to read the memory, and therefore a hardware-assisted integrity monitor may locate the physical addresses of a protected hypervisor and/or privileged domain. In one aspect of embodiments, a hardware-assisted integrity monitor may check symbol files and/or CPU registers. In another aspect of embodiments, a hardware-assisted integrity monitor may read the virtual addresses of the target memory from symbol files. In further aspects of embodiments, a hardware-assisted integrity monitor may utilize CPU registers to find the physical addresses corresponding to virtual addresses.

Related systems, which may only employ symbol files to read the virtual addresses and calculate the physical addresses irrespective of registers, may not detect attacks that modify page tables and/or leave the original memory untouched. Related systems, which may acquire physical addresses without employing registers by scanning the entire physical memory and/or employing pattern matching to find all potential targets, may not be relatively scalable and/or efficient, for example where hypervisors and/or operating system kernels have relatively small memory footprint.

A. Example Acquiring Physical Memory Embodiments

According to some aspects of embodiments, acquiring the physical memory may include a software-based process and/or a hardware-based process. For example, a software-based process may employ the interface provided by the OS and/or the hypervisor to access the physical memory, such as /dev/kmem on Linux and/or \Device \PhysicalMemory on Windows. A software-based process may rely on the integrity of the underlying operating system and/or the hypervisor. Therefore, if the operating system and/or the hypervisor is compromised, malware may provide a false view of the physical memory. Moreover, the interfaces to access memory may be disabled in future versions of operating systems. In some aspects of embodiments, a hardware-based process, alone or in combination with a software-based process, may be employed to read the physical memory.

According to some aspects of embodiments, a hardware-based process may maximize reliability, for example where there may be relatively less dependence on the integrity of an operating system and/or a hypervisor. In some aspects of embodiments, a hardware-based process may employ a PCI device and/or other kinds of hardware. In one aspect of embodiments, a variety of hardware components may be employed, for example a PCI device, a FireWire bus device, a customized chipset, and/or the like.

According to some aspects of embodiments, a hardware-assisted integrity monitor may place drivers in SMM code. Ethernet cards may employ drivers to operate, which may run in an operating system and/or driver domain. Drivers, however, may be vulnerable to attacks and/or may be compromised. In one aspect of embodiments, SMRAM memory may be locked after booting, and/or may not be modified by an attacker to minimize the possibility of attack and/or compromise. In another aspect of embodiments, a hardware-assisted integrity monitor may employ a secret key to minimize the possibility to employ a malicious NIC driver in the OS and spoof an SMM driver. In further aspects of embodiments, a key may be obtained from a monitor machine at any time, for example when a target machine is booting up and/or stored in the SMRAM. In other aspects of embodiments, a key may be employed as a random seed to selectively hash a relatively small portion of the data, for example to avoid and/or minimize data replay attacks.

According to some aspects of embodiments, a hardware-assisted integrity monitor may verify that hardware is not disabled. In Denial of Service (DoS) attacks, for example, a device may be stopped and/or disabled. According to ACPI specification, for example, a PCI device may support $D_3$ state such that an attacker that takes control of the operating system, as ACPI was designed to allow the operating system to control the state of the devices, may suspend an ACPI-compatible device. An attacker may also selectively stop a NIC without stopping any other hardware. In one aspect of embodiments, ACPI DoS attacks may be minimized, for example by employing an out-of-band mechanism to verify that a PCI card is not disabled. In another aspect of embodiments, a remote server that receives state snapshots may operate to verify that a PCI card is not disabled.

B. Example Translating Physical Memory Embodiments

There may be a semantic gap between the physical memory monitored and the virtual memory addressing used by a hypervisor. According to some aspects of embodiments, for example to translate the physical memory, an analysis module may be aware of the semantics of the physical memory layout which may be a function of the specific hypervisor monitored. In some aspects of embodiments, an acquiring module may support different analysis modules with no and/or minimized modifications.

According to some aspects of embodiments, an analysis module may employ three properties of the kernel memory: linear mapping, static nature and persistence. In one aspect of embodiments, linear mapping may refer to the kernel (OS and/or hypervisor) memory being linearly mapped to physical memory and/or the physical addresses being fixed. For example, on x86 architecture, the virtual memory of Xen hypervisor may be linearly mapped into the physical memory. Therefore, in order to translate the physical address to a given virtual address in Xen, a hardware-assisted integrity monitor may subtract the virtual address from an offset. In addition, Domain 0 of Xen may be linearly mapped to the physical memory. The offset for Domain 0 may be different on different machines but may remain the same on a given machine. Moreover, other operating system kernels, such as Windows, Linux or OpenBSD, may have this property when they are running directly on real hardware.

According to some aspects of embodiments, static nature may relate to the contents of the monitoring part of the hypervisor being static. If the contents are changing, there may be a time window between the CPU changing the contents and an acquiring module reading them, which may result in inconsistency for analysis and/or verification. In another aspect of embodiments, persistence property may relate to not swapping out the memory used by hypervisors to the hard disk. If the memory is swapped out, identifying and/or matching any content by only reading the physical memory may not be employed. In such case, a hardware-assisted integrity monitor may read the swap file on the hard disk. Xen hypervisor and/or most operating systems may employ these three properties.

C. Example Reading and/or Verifying CPU Register Embodiments

According to some aspects of embodiments, software-based and/or hardware-based process may be employed to read registers. In a software-based process, a kernel module may be installed in a hypervisor and/or registers may be obtained by reading from the CPU directly. Such a process may be vulnerable to the rootkits, which may modify the kernel module and/or replace it with a counterfeit. In a hardware-based process, a chipset may be employed to obtain registers, which may minimize integrity issues raised by software-related approaches.

According to some aspects of embodiments, a hardware-assisted integrity monitor may employ SMM, for example SMM in x86 CPU. SMM may be a different CPU mode from the protected mode, which the hypervisor and/or the operating system may reside in. When a CPU switches to SMM, it may save the register context in the SMRAM. The default SMRAM size may be 64K Bytes, beginning at a base physical address in physical memory which may reference the SMBASE. The SMBASE default value following a hardware reset may be 0x30000. The processor may look for the first instruction of the SMI handler at the address [SMBASE+0x8000]. It may store the processor's state in an area, for example from [SMBASE+0xFE00] to [SMBASE+0xFFFF]. If SMI handler issues rsm instruction, the processor may switch back to the previous mode (e.g., protected mode). In addition, the SMI handler may access I/O devices.

According to some aspects of embodiments, a hardware-assisted integrity monitor may verify the registers in SMM and/or report the result. In some aspects of embodiments, results may be transmitted via an I/O device, for example an Ethernet card, to one or more monitor machines. In one aspect of embodiments, a hardware-assisted integrity monitor may monitor registers, for example IDTR and/and CR3. In another aspect of embodiments, IDTR may not change after system initialization. In further aspects of embodiments, SMM code may employ CR3 to translate the physical addresses of the hypervisor kernel code and/or data. In other aspects of embodiments, the offsets between physical addresses and virtual addresses may not change.

2. Example Implementation Embodiments

According to some aspects of embodiments, a hardware-assisted integrity monitor may be configured to employ a virtual machine, which may utilize QEMU full system emulation. In some aspects of embodiments, a hardware-assisted integrity monitor may be configured to employ a physical machine. In one aspect of embodiments, a hardware-assisted integrity monitor may be configured to employ non-virtualized hardware. In another aspect of embodiments, a hardware-assisted integrity monitor configured to employ QEMU, and/or a physical machine may be configured to implement an acquiring module. In further aspects of embodiments, an analysis module may include an Intel e1000 Ethernet card. In other aspects of embodiments, a program may run in the SMM to collect and/or transmit the CPU registers, for example employing the Ethernet card.

According to some aspects of embodiments, a target machine may be configured to include a virtual machine which may employ QEMU. In some aspects of embodiments, an analysis module may run on a host operating system of QEMU. In one aspect of embodiments, a relatively small NIC driver may be placed into the SMM of a target machine for an acquiring module. In another aspect of embodiments, a NIC may be configured to employ a driver and/or transmit the contents of physical memory, for example as an Ethernet frame. In further aspects of embodiments, an analysis module on a monitoring machine may be configured to receive one or more packets from a network. In more aspects of embodiments, an analysis module may be configured to compare contents of the physical memory with original, initial and/or stored versions. If a new snapshot of the memory content is different from a prior one (e.g., original one), an analysis module may report the event to a system operator, which may be configured to decide how to proceed.

According to some aspects of embodiments, more than one physical machine may be employed. In some aspects of embodiments, one physical machine may be configured to be employed as a target and a second physical machine may be configured to be employed as a monitor. In one aspect of embodiments, Xen 3.1 may be installed natively on a target machine and/or a physical Intel e1000 Ethernet card may be configured to be employed as an acquiring module. In another aspect of embodiments, default SMM code may be modified on a target machine, for example to provide the system similarly to QEMU embodiments. In further aspects of embodiments, an analysis module may be configured to operate on a monitor machine.

A. Example Implementation Memory Acquiring Module Embodiments

According to some aspects of embodiments, employing an acquiring module may include porting a driver, for example an e1000 network card driver, into SMM to scan and/or transmit the memory. In some aspects or embodiment, SMM code may be a part of BIOS. In one aspect of embodiments, the source code of the BIOS may not be available. In another aspect of embodiments, default SMM code may be modified.

In further aspects of embodiments, SMM code may be modified by providing and/or writing the SMM code in 16-bit assembly, employing a user-level program to open the SMRAM and/or copying the assembly code to the SMRAM.

According to some aspects of embodiments, a driver may be divided. In some aspects of embodiments, for example, an e1000 driver may be divided into two parts: initialization and data transfer, where the initialization part may be complex and/or similar to the Linux driver, and/or where the communication part may be relatively simpler and/or different from the Linux driver. In one aspect of embodiments, an existing Linux e1000 driver may be modified to initialize a network card and/or program the transferring part in assembly. In another aspect of embodiments, an e1000 driver on Linux may be modified to initialize a NIC but not send out any packets. In further aspects of embodiments, assembly code may be compiled to an ELF object file. In other aspects of embodiments, a relatively small loader may be employed, which may parse an ELF object file, load code and/or data to SMM.

According to some aspects of embodiments, a NIC driver may be ported to SMM. In some aspects of embodiments, a driver may be modified to scan the memory and/or send data out. In one aspect of embodiments, a hardware-assisted integrity monitor may employ two transmission descriptors per packet, where one may be for a header and the other may be for remaining data. In another aspect of embodiments, the content of a header may be predefined. In further aspects of embodiments, a NIC may be initialized by an OS, and/or a driver in SMM may prepare a descriptor table and/or write it to a Transmit Descriptor Tail (TDT) register of a NIC. In other aspects of embodiments, a NIC may be configured to communicate a packet to a monitoring machine, for example employing DMA. In more aspects of embodiments, a NIC driver in SMM may be configured to prepare header data and/or allow the descriptor to point to a header. For the payload, a descriptor may be directly pointed to the address of the memory that needs to be scanned in some aspects of embodiments. An e1000 NIC may support CRC offloading in some aspects of embodiments.

According to some aspects of embodiments, a secret key may be transferred from a monitor machine to a target machine. In one aspect of embodiments, a secret key may be exchanged upon booting. In another aspect of embodiments, exchanging a secret key may minimize attacks, for example replay attacks.

According to some aspects of embodiments, a key may be employed to create a random seed to selectively hash data. In some aspects of embodiments, performance impact may be relatively high if the entire data stream is hashed. In one aspect of embodiments, a secret key may be employed as a seed to generate one relatively big random number used for one-time pad encryption and/or another set of serial random numbers, for example to minimize the overhead. In further aspects of embodiments, the serial of random numbers may be employed as the indexes of the positions of the memory being scanned. In other aspects of embodiments, the content at these positions may be XORed with a one-time pad including substantially the same length before starting a NIC DMA. In more aspects of embodiments, the memory content may be again XORed to restore the original value, for example after the transmission is completed.

According to some aspects of embodiments, a NIC driver may also check loop-back setting of a device, for example before sending a packet. In some aspects of embodiments, data integrity may be enhanced where the SMM NIC driver remains in the SMM until substantially all the packet is written to the internal FIFO of the NIC. In one aspect of embodiments, more data may be added to the end, for example 64 KB more data added to the end, to flush the internal FIFO of a NIC. In another aspect of embodiments, an attacker may not employ loopback mode to determine a secret key and/or peek into an internal NIC buffer through debugging registers of a NIC.

B. Example Implementation Analysis Module Embodiments

According to some aspects of embodiments, a dedicated network card on a monitoring machine may be connected with an acquiring module. In some aspects of embodiments, an operating system of a monitoring machine may be CentOS 5.3. In one aspect of embodiments, tcpdump may be operated to filter the packets from an acquiring module and/or the output of tcpdump may be communicated to an analysis module. In another aspect of embodiments, an analysis module may be written in a Perl script, may read the input, and/or may check for any anomalies. In further aspects of embodiments, an analysis module may recover the contents employing a same secret key, for example the same secret key. In other aspects of embodiments, an analysis module may compare snapshots, for example every two consecutive memory snapshots bit by bit. In more aspects of embodiments, an analysis module may output an alert on a console if the snapshots are different, as the persistent and/or static portion of a hypervisor memory may be checked. In embodiments, an operator may then determine whether the difference constitutes a normal update of a hypervisor and/or an intrusion.

During the system boot time, contents of control data and/or code may be changing. According to some aspects of embodiments, an analysis module may check the integrity of the control data and/or code. In some aspects of embodiments, the control data may include a table, for example an IDT table, hypercall table and/or exception table of Xen. In one aspect of embodiments, the code may be the code part of a hypervisor, for example Xen hypervisor. In another aspect of embodiments, the physical address of control tables may be determined. In further aspects of embodiments, Xen.map symbol file may be employed to determine physical addresses.

According to some aspects of embodiments, the virtual addresses of idt_table, hypercall_table and/or exception table may be determined. In some aspect of embodiments, the physical address of these symbols may be virtual address—0xff00,0000 on x86-32 architecture with PAE. In one aspect of embodiments, the address of Xen hypervisor code may be between _stext and _etext. In another aspect of embodiments, a hardware-assisted integrity monitor may monitor the control data and/or codes of Domain 0. In further aspects of embodiments, control data and/or codes may include a system call table and/or code part of Domain 0 (e.g., a modified Linux 2.6.18 kernel). In other aspects of embodiments, the kernel of Domain 0 may be linearly mapped to the physical memory. In more aspects of embodiments, a kernel module running in Domain 0 may be employed to compute the exact offset, for example 0x83000000. There may not be an IDT table for Domain 0, for example where there is only one such table in a hypervisor. These parameters may be input to an acquiring module in some aspects of embodiments, for example to maximize the scan efficiency.

According to some aspects of embodiments, a hardware-assisted integrity monitor may check the code part of a hypervisor to detect attacks which may not modify the control table, but just modify the code invoked by those tables. Control tables may be important to system integrity. If their contents are compromised by malware, it may run arbitrary code in the hypervisor level (e.g., the most privileged level). An antivirus software and/or intrusion detection system that runs in Domain 0 may be unable to detect this hypervisor level malware because they may rely on the hypervisor to provide the correct information. If the hypervisor itself is compromised, it may provide fake information to hide the malware. Checking for the code part of a hypervisor may allow a hardware-assisted integrity monitor to detect the attacks which do not modify the control table but just modify the code invoked by those tables.

C. Example Implementation CPU Register Checking Module Embodiments

According to some aspects of embodiments, a hardware-assisted integrity monitor may employ SMM code to acquire and/or verify CPU registers. In some aspects of embodiments, an SMI handler may be integrated into BIOS and/or it may be set up during the system boot time. In one aspect of embodiments, bootstrap may be protected by one or more trusted bootstrap mechanisms. In another aspect of embodiments, a chipset may provide a function to lock the SMRAM. In further aspects of embodiments, SMM handler may not be changed until reboot once it is locked. In other aspects of embodiments, the SMRAM may be locked once it is set up. In more aspects of embodiments, processes may be employed to modify default SMM code.

According to some aspects of embodiments, one or more steps may be employed to check a CPU register: for example, 1) triggering SMI to enter SMM; 2) checking the registers in SMM; and/or 3) reporting the result. In some aspects of embodiments, SMI may be a hardware interrupt and/or may be triggered by hardware. I/O Controller Hub (ICH) (e.g, Southbridge) may define the events to trigger SMI. In one aspect of embodiments, a QEMU may emulate Intel 82371SB chip as a Southbridge. In another aspect of embodiments, it may support device idle events to generate SMI. SMI may be employed for power management, and/or Southbridge may provide some timers to monitor the state of a device. If a device remains idle for a relatively long time, it will trigger SMI to turn off that device. The resolutions of these timers may be one second. However, on different motherboards, the process to generate the SMI may be different. Therefore, an I/O device may be employed, for example an Ethernet card, to trigger the SMI event in some aspect of embodiments.

According to some aspects of embodiments, a hardware-assisted integrity monitor may be configured to employ and/or monitor IDTR and/or CR3 registers, for example to check a register. In some aspects of embodiments, the contents of IDTR may not change after system boot. In one aspect of embodiments, the SMM code may read this register by sidt instruction. In another aspect of embodiments, a hardware-assisted integrity monitor may employ CR3 to find out the physical addresses of hypervisor kernel code and/or data given their virtual addresses. In further aspects of embodiments, a hardware-assisted integrity monitor may walk through page tables, for example all page tables as a hardware Memory Management Unit (MMU) does.

According to some aspects of embodiments, an offset between the virtual address and the physical address of hypervisor kernel code and/or data may not change. In some aspects of embodiments, it may be 0xff000000 for Xen 32 bit with PAE. The Domain 0 may include substantially the same property. In one aspect of embodiment, the SMM code may employ the virtual address range as the input (e.g., this may be obtained through the symbol file and/or sent to the SMM in the boot time) and/or check their physical addresses. In another aspect of embodiments, for example if any physical address is not equal to virtual address—offset, a possible attack may be discovered. In further aspects of embodiments, the SMM code may report the result of checking, for example employing an I/O device such as an Ethernet card. In other aspects of embodiments, the assembly code of it may be 67 LOC.

According to some aspects of embodiments, the SMM code may be configured to employ one or more I/O devices to report a result, for example an Ethernet card employed to report a result. In some aspects of embodiments, it may be relatively difficult to send a report reliably absent a card without stopping the whole system. For example, the SMM code may write the result to a fixed address of physical memory, although an attacker may have access to that physical memory and/or may easily modify the result. The SMM code may write it to the hard disk, but an attacker may alter it. Since security may not rely on the obscurity, absent a network card, a system may remain in the SMM mode and put the warning message on the screen. This may be reliable, but a system in the protected mode may become completely frozen. Such processes may not be desirable, and/or may be leveraged by an attacker to launch attacks, for example Denial of Service attacks.

D. Example Virtual and Physical Hardware-Assisted Integrity Monitor Embodiments According to some aspects of embodiments, a hardware-assisted integrity monitor may include a virtual-based acquiring module and/or a physical-based acquiring module. In some aspects of embodiments, a SMM NIC driver may be ported from QEMU to a physical machine. In one aspect of embodiments, an acquiring module configured to operate in a virtual environment and/or a physical-based may include substantially the same model of the NIC, for example an 82540EM Gigabit Ethernet card. In another aspect of embodiments, a SMM NIC driver from a QEMU VM may not work on a physical machine. In further aspects of embodiments, the NIC may access the SMRAM in a QEMU VM and may not on a physical machine (e.g., Dell Optiplex GX 260). In other aspects of embodiments, the TX descriptor for a SMM NIC driver may be stored in the SMRAM and/or operate relatively well.

According to some aspects of embodiments, a NIC may not read a TX descriptor in the SMRAM and therefore may not be configured to transmit any data. In some aspects of embodiments, a portion of physical memory may be reserved, for example by adding a boot parameter: mem=500M to the Xen hypervisor and/or Linux kernel. In one aspect of embodiments, since the total physical memory on the physical machine may be approximately 512 MB, 12 MB may be reserved for a hardware-assisted integrity monitor by using mem parameter. In another aspect of embodiments, the 12 MB may be employed to store the data used by SMM NIC and/or the TX descriptor ring. In further aspects of embodiments, a loader may be modified to operate as a kernel module, for example to call ioremap( ) to map the physical memory to a virtual address and/or load the data there. In more aspects of embodiments, a TX descriptor ring may be prepared every time by the SMM code, for example before transmitting the packet. A loader may be employed to load a TX descriptor in some aspects of embodiments, for example where the source code of the BIOS is not known.

According to some aspects of embodiments, a debugging interface may be provided and/or employed for the SMM code, for example on a physical machine. In one aspect of embodiments, the reserved physical memory may be configured to pass the information between the SMM code and the OS. In another aspect of embodiments, an interface may be configured to measure the performance of the SMM code.

3. Example Evaluation Embodiments

According to some aspects of embodiments, properties may be verified which may allow a hardware-assisted integrity monitor to protect code. In some aspects of embodiments, the detection for hypervisor rootkits may be tested and/or the operational overhead may be measured. In one aspect of embodiments, testbeds may be employed, for example testbed 1 employed for a hardware-assisted integrity monitor configured to be operated in a virtual environment, and/or a monitor machine for a hardware-assisted integrity monitor configured to be operated in a physical environment. In another aspect of embodiments, for example testbed 2, a hardware-assisted integrity monitor may be configured to operate in a physical environment and/or may be employed to produce plotted performance overhead on real hardware.

According to some aspects of embodiments, testbed 1 may be equipped with a Dell Precision 690 including 8 GB RAM and/or one 3.0 GHz Intel Xeon CPU with two cores. In some aspects of embodiments, a host operating system may include CentOS 5.3 64 bit. In one aspect of embodiments, a QEMU version may include 0.10.2 (e.g., without kqemu). In another aspect of embodiments, Xen version may be 3.3.1, and/or Domain 0 may include CentOS 5.3 32 bit with PAE. In further aspects of embodiments, testbed 2 may include a Dell Optiplex GX 260 with one 2.0 GHz Intel Pentium 4 CPU and/or 512 MB memory. In other aspects of embodiments, Xen 3.1 and/or Linux 2.6.18 may be installed on a physical machine, and/or the Domain 0 may include CentOS 5.4. In more aspects of embodiments, features of testbeds may be combined.

A. Example Verifying Static Property Embodiments

According to some aspects of embodiments, control data and/or respective code may be statically mapped into the physical memory. In some aspects of embodiments, a monitoring module may be configured to detect legitimate control data and/or code modifications. In one aspect of embodiments, a hardware-assisted integrity monitor may be configured to be employed against data changes and/or self-modifying code, for example in the Xen hypervisor and/or Domain 0. In another aspect of embodiments, a hardware-assisted integrity monitor may be configured to test and/or monitor static properties, for example of Linux 2.6 and/or Windows XP 32 bit kernels. In further aspects of embodiments, a hypervisor and/or operating systems may be booted into a minimal state.

Referring to example FIG. 3, a table illustrates symbols that may be employed in accordance with some aspects of embodiments. According to some aspects of embodiments, symbols may include any suitable symbol, for example symbols for Xen hypervisor, Domain 0, Linux and Windows and/or the like. In one aspect of embodiments, control data and/or code may change during boot. In another aspect of embodiments, the physical memory of IDT may be all 0, but may become non-zero and/or static after several seconds, for example if the IDT table is initialized later in the boot process.

B. Example Detection Embodiments

According to some aspects of embodiments, a hardware-assisted integrity monitor may be configured to detect attacks to a hypervisor. In some aspects of embodiments, a hardware-assisted integrity monitor may detect DMA on Xen hypervisor. In one aspect of embodiments, a hardware-assisted integrity monitor may be tested in a testing environment, for example testbed 1, to detect attacks. HDD DMA attacks may be ported to modify the Xen hypervisor and/or Domain 0, for example four attacks to Xen hypervisor and/or two attacks to Domain 0. A pcnet network card in QEMU may be modified to perform a DMA attack from the hardware directly. A modified pcnet NIC may be used to attack Linux and/or Windows operating systems, for example three attacks to Linux 2.6.18 kernel and/or two attacks to Windows XP SP2 kernel, each of which configured to target one control table and/or the code, and/or modify the IDT table and/or other tables of the kernel. In further aspects of embodiments, a hardware-assisted integrity monitor may be configured to operate in a virtual environment to detect all such attacks, for example reporting that the contents of memory in a target machine are changed.

C. Example Monitoring Overhead Embodiments

According to some aspects of embodiments, a source of overhead may include the transmission of the memory contents to an external monitoring machine. In some aspects of embodiments, a hardware-assisted integrity monitor may remain in SMM and wait until NIC transmission is completed, for example to minimize tampering of memory contents, an attacker's control of the OS, modification of the memory contents and/or of the transmit descriptor in the main memory while transmitting. In one aspect of embodiments, the time to transmit a single packet while varying its payload size may be measured. In further aspects of embodiments, a packet may be flushed out, for example when a Transmit Descriptor Head register (TDH) is equal to a Transmit Descriptor Tail register (TDT). In other aspects of embodiments, elapsed time may be calculated, for example employing the rdtsc instruction to read the time stamp before and/or after each operation. In more aspects of embodiments, the time may linearly increase as the size of a packet increases.

Figure 4:
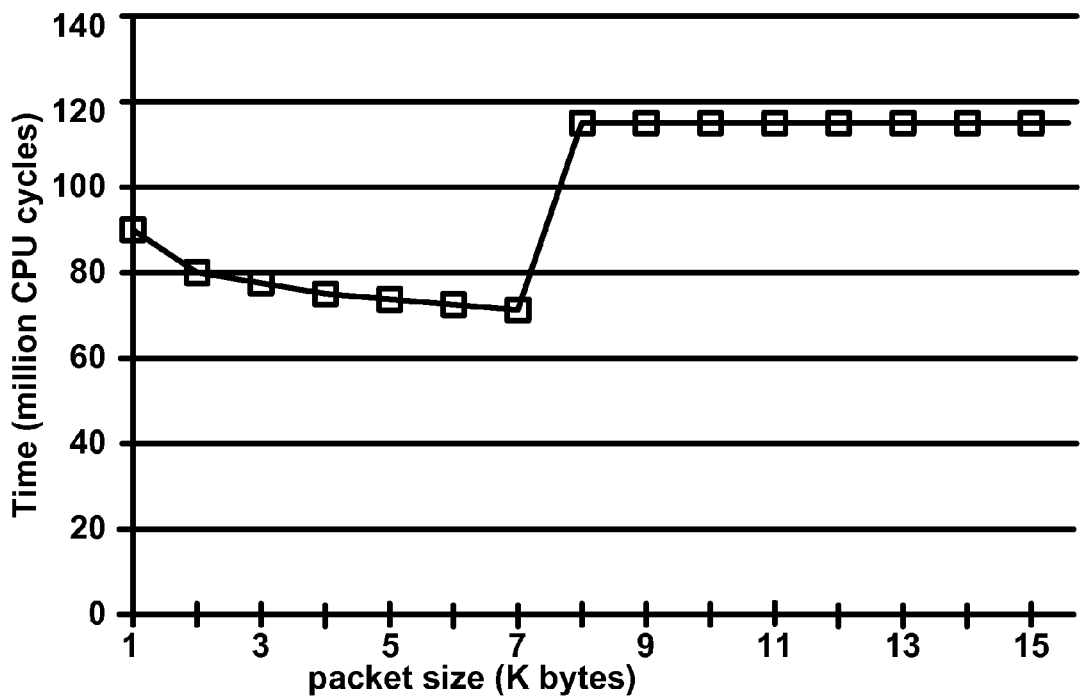
FIG. 4 illustrates a graph showing network overhead for packet size as a function of time in accordance with some aspects of embodiments.

Referring to example FIG. 4, a graph illustrates network overhead for packet size as a functions of time in accordance with some aspects of embodiments. According to some aspects of embodiments, bandwidth may be measured, for example employing different packet sizes to send out fixed amount of data such as 2881 KB memory (e.g., the size of Xen code plus Domain 0 code). In some aspects of embodiments, the time to send data may be substantially similar to a constant value, for example when packet size is less than approximately 7 KB. In one aspect of embodiments, overhead may relatively increase and/or remain relatively high, for example when packet size is approximately 8 KB. In another aspect of embodiments, an internal NIC transfer FIFO may be 16 KB, and/or a NIC may not hold two packets in the FIFO at the same time when packet size becomes approximately 8 KB or larger, which may introduce delay.

Figure 5:
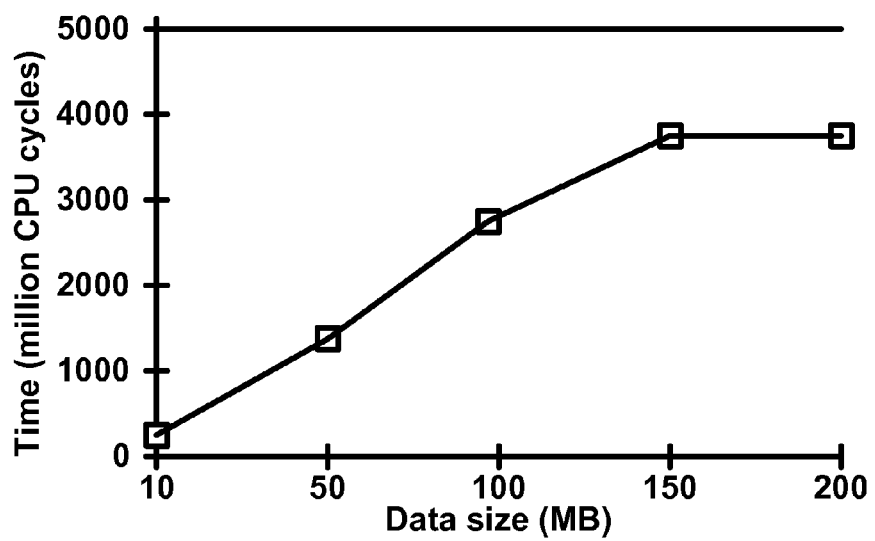
FIG. 5 illustrates a graph showing network overhead for data size as a function of time in accordance with some aspects of embodiments.

Referring to example FIG. 5, a graph illustrates network overhead for data size as a function of time in accordance with some aspects of embodiments. In some aspects of embodiments, a hardware-assisted integrity monitor may be configured to monitor different sized hypervisors and/or OSes. In one aspect of embodiments, the time to send a different amount of data may be measured. In another aspect of embodiments, a packet size may be selected and/or employed, for example approximately 7 KB may be selected and/or employed where it provides the relatively shortest delay. In further aspects of embodiments, time may increase with the amount of memory, for example substantially linearly increase. In other aspects of embodiments, a hardware-assisted integrity monitor may be configured to perform PCI scanning, trigger SMI interrupt (e.g., every second) and/or check the registers in SMM. In more aspects of embodiments, the overall overhead associated with entering SMM, executing SMM code and/or returning from SMM may be measured, for example by providing and/or writing a kernel module running in Domain 0.

According to some aspects of embodiments, a hardware-assisted integrity monitor may be configured to operate in a physical environment, for example to run a test in testbed 2. In some aspects of embodiments, a test may be repeated one or more times, and/or the results may be provided for each test, as an average, and/or the like. In one aspect of embodiments, overall time may include one or more parts. In another aspect of embodiments, the time to XOR data with a secret key may be a part of overall time. In a further aspect of embodiments, the time to access the memory may be a part of overall time. In other aspects of embodiments, the time to configure a card and/or switch from protected mode to SMM and back may be a part of overall time. In more aspects of embodiments, the time to send out the data through a NIC may be part of overall time.

According to some aspects of embodiments, test programs may be provided and/or written to determine the amount of time spent in each part of overall time. In one aspect of embodiments, an SMM code may be provided which may do nothing except for returning from SMM to CPU protected mode. In another aspect of embodiments, an SMM code may be provided which may not access the main memory but may employ the registers to simulate the verification of IDTR and/or CR3. In another aspect of embodiments, the running time may test one or more programs, for example for the two provided and/or written SMM codes. In further aspects of embodiments, the time to switch between protected mode and SMM, and then switch back, may be determined from the former SMM code. In other aspects of embodiments, the time for the CPU computation part of the verification of IDTR and/or CR3 may be determined from the later SMM code.

Figure 6:
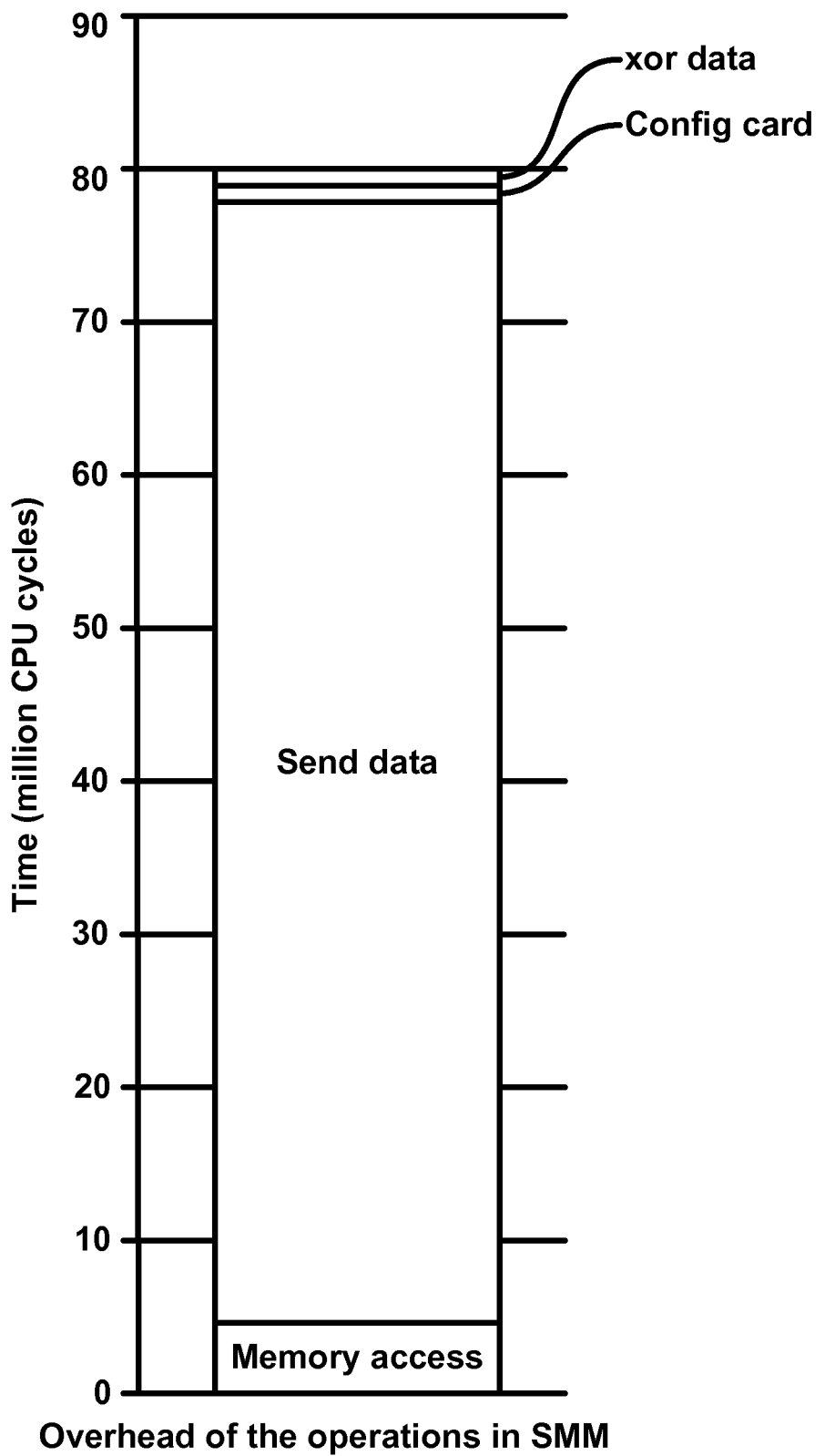
FIG. 6 illustrates a graph showing overhead for operations in system management mode (SMM) as a function of time in accordance with some aspects of embodiments.

Referring to example FIG. 6, a graph illustrates overhead for operations as a functions of time in accordance with some aspects of embodiments. In one aspect of embodiments, relatively most of the time may be spent in sending the data, for example approximately 73 Million cycles. In another aspect of embodiments, the time to accesses the main memory may be relatively small, for example approximately 5.28 Million cycles, while other portion may be relatively smaller. In further aspects of embodiments, total time may be approximately 80 Million cycles and/or CPU (e.g., of testbed 2) may be 2 GHz, such that SMM code may consume approximately 4.0% of the CPU cycles and/or take approximately 40 ms.

According to some aspects of embodiments, the code size of SMM code may be selected and/or measured. In some aspects of embodiments, the code size of SMM code may be approximately 300 Bytes. In one aspect of embodiments, for example on a monitor machine, the overhead associated with reading the memory contents and comparing them with a previous state may take 230 ms, including only approximately 49 ms associated with comparing the data. In another aspect of embodiments, it may be possible to reduce the relative time for reading the memory contents from the file, for example by employing a pipe and/or other memory sharing-based communication between tcpdump and the perl script.

Figures 7, 8:
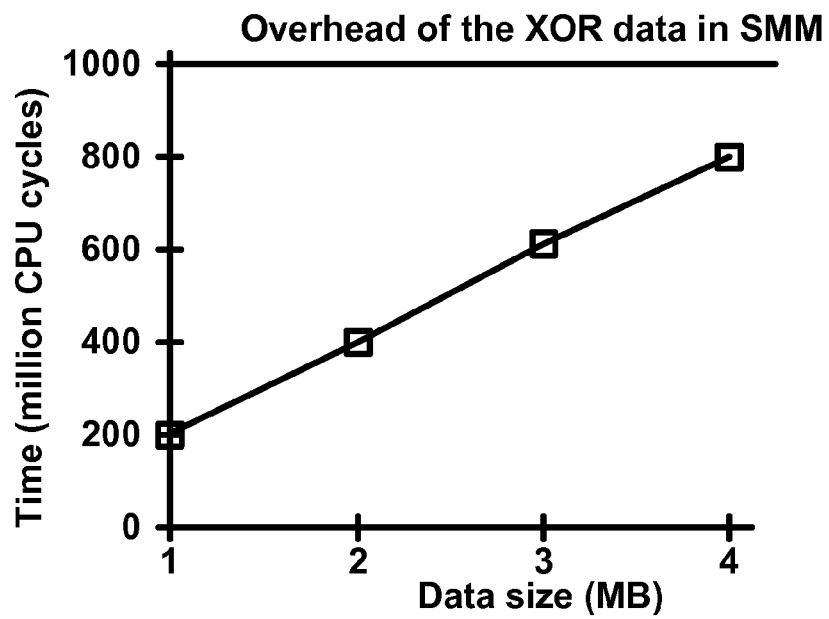
FIG. 7 illustrates overhead of XOR data in SMM as a function of time in accordance with some aspects of embodiments.
FIG. 8 illustrates a table showing time overhead for a hardware-assisted integrity monitor compared to related approaches in accordance with some aspects of embodiments.

According to some aspects of embodiments, related approaches, for example indicating that SMM read the memory and hash it on a target machine (e.g., SMM-only), may be compared to a hardware-assisted integrity monitor. In one aspect of embodiments, a program may be provided and/or written to XOR the memory in SMM with different sizes. Referring to example FIG. 7, overhead of XOR data in SMM as a function of time is illustrated, and demonstrates that the time for XOR data may be approximately linearly increased with the amount of data and/or uses hundreds of Million CPU cycles.

According to some aspects of embodiments, related TPM-based approaches, which may be employed to monitor the integrity of the kernels, may be compared to a hardware-assisted integrity monitor. Referring to example FIG. 8, a table illustrates time overhead of a hardware-assisted integrity monitor compared to related approaches in accordance with some aspects of embodiments. In one aspect of embodiments, HC may relate to a hardware-assisted integrity monitor. In another aspect of embodiments, overhead which may be associated with a hardware-assisted integrity monitor may be one magnitude lower than SMM-only and/or TPM-based processes. In further aspects of embodiments, a SMM-only approach may need to hash substantially the entire data to check its integrity, while a hardware-assisted integrity monitor may be configured to only hash a portion (e.g., random portion) of the data and/or send substantially the entire data out using an Ethernet card. Furthermore, the most expensive operation in a TPM-based process may be TPM quote, which alone may take 972 ms.

Referring to example FIG. 9, a table illustrates an overall comparison between a hardware-assisted integrity monitor and other processes in accordance with some aspects of embodiments. In some aspects of embodiments, a hardware-assisted integrity monitor may be configured to monitor both memory and registers with a relatively low overhead, compared to related approaches.

4. Example Security Analysis Embodiments

According to some aspects of embodiments, a hardware-assisted integrity monitor may detect modifications to the control data and/or the codes of hypervisors or OS kernels, and/or the like. Such attacks are realistic, and may have a significant impact on a computer device, system, and/or the like. In one aspect of embodiments, a hardware-assisted integrity monitor may detect such attacks by employing an I/O device, for example an Ethernet card, to read the physical memory via DMA and then analyze it. In another aspect of embodiments, for example if an attacker controls the hypervisor and makes some modifications, a hardware-assisted integrity monitor may detect the change by reading the physical memory directly and comparing it with previous pristine value.

According to some aspects of embodiments, a hardware-assisted integrity monitor may employ SMM to monitor CPU registers, which may provide further protection. In related approaches, the symbol table in the symbol file may be employed to find the physical address of the kernel code and data, but there may not be binding between the addresses in the symbol table and the actual physical address of these symbols. For example, one potential attack may include modifying the IDTR register of the CPU to point to another address. The malware may modify the new IDT table, keeping the old one untouched. Another potential attack may include keeping the IDTR register untouched, but modifying the page tables of the kernel so that the virtual address in the IDTR will actually point to a different physical address.

According to some aspects of embodiments, a hardware-assisted integrity monitor may detect these attacks by checking CPU registers in SMM. In some aspects of embodiments, a hardware-assisted integrity monitor in SMM may read the content of IDTR and/or CR3 registers employed by the operating system. IDTR may not change after booting. In one aspect of embodiments, for example if there is a change, a hardware-assisted integrity monitor may generate and/or send a warning through an I/O device (e.g., an Ethernet card). In another aspect of embodiments, a hardware-assisted integrity monitor may determine the actual physical address form CR3 given the virtual ones. The offset between the virtual addresses and the physical addresses may be static. In further aspects of embodiments, for example if some offsets changed, a hardware-assisted integrity monitor may generate and/or communicate a warning. PCI devices, including an Ethernet card, may be modified to acquire a different view of the physical memory. In other aspects of embodiments, a hardware-assisted integrity monitor may be configured to check the corresponding settings in SMM to minimize such problems.

According to some aspects of embodiments, a network card driver of a hardware-assisted integrity monitor may be put into the SMM code, for example to avoid and/or minimize malicious modifications. In another aspect of embodiments, for example to prevent and/or minimize replay attacks, a key may be employed to hash a portion of data randomly and/or send them out to an analysis module. In further aspects of embodiments, a key may be private and/or locked in SMRAM, such that an attacker may not access it get and/or generate the same hash.

According to some aspects of embodiments, for example where an attacker may try to disable a Ethernet card and/or the SMM code, a hardware-assisted integrity monitor may employ an out-of-band monitor, such as Dell remote access controller, to minimize and/or prevent such attacks. In some aspects of embodiments, for example where an attacker may try to launch a fake reboot attack to get a private key from a monitor machine (e.g., mimic the SMM NIC driver and send a request for a new key) one or more approaches may be employed. In one aspect of embodiments, for example, a Trusted Platform Module (TPM)-based remote attestation may be employed to verify the running state of a target machine. In such a case, checking whether the OS has been started or not may be sufficient, and if already started, a monitor machine may refuse to send a key. In another aspect of embodiment, for example if a target machine does not have a TPM, another reliable reboot signal may be communicated to a target machine when it asks for a key to make verify the SMM code is running.

According to some aspects of embodiments, the time window between scans may be selected, for example to be one second. In one aspect of embodiments, for example where malware makes some changes in the time interval and restores it before the next scan, the scan interval may be randomized to relatively increase the chances for detection. In another aspect of embodiments, relatively high bandwidth devices, such as PCI Express, may be employed which may be able to reach 5 GT/s transfer rate, to minimize the scan interval. In further aspects of embodiments, for example if the memory mappings of a hypervisor do not hold properties (e.g., linear mapping, persistence and/or static nature), a hardware-assisted integrity monitor may relatively improve an acquiring module and/or analysis module, for example to capture and/or analyze dynamic memory.

5. Further Example Embodiments

According to some aspects of embodiments, a hardware-assisted integrity monitor may be configured to protect the code integrity of software running on commodity computer hardware. In some aspects of embodiments, software which may be protected may include VMMs and/or Operating Systems. In one aspect of embodiments, SMM may be employed to securely generate and/or transmit the state of a machine (e.g., the full state of a protected machine) to a server (e.g., an external server). In another aspect of embodiments, a hardware-assisted integrity monitor may not rely on any software running on a target machine, and/or may employ BIOS. In further aspects of embodiments, a hardware-assisted integrity monitor may be robust against attacks that aim to disable or block its operation.

According to some aspects of embodiments, a hardware-assisted integrity monitor may be configured to operate in a virtual environment, physical environment and/or combinations thereof. In one aspect of embodiments, a hardware-assisted integrity monitor may be configured to operate employing QEMU, employing an Ethernet card on a commodity x86 machine, and/or combinations thereof.

According to some aspects of embodiments, a hardware-assisted integrity monitor may be configured to identify alterations, for example of control data and/or code, on various types of existing systems. In one aspect of embodiments, a hardware-assisted integrity monitor may generate and/or communicate a scan of the state of the protected software in less than approximately 40 ms, and/or may be employed in part of an Xen hypervisor, the Domain 0 in Xen, and/or control structures of other operating systems, for example Linux and Windows.

Figure 10:
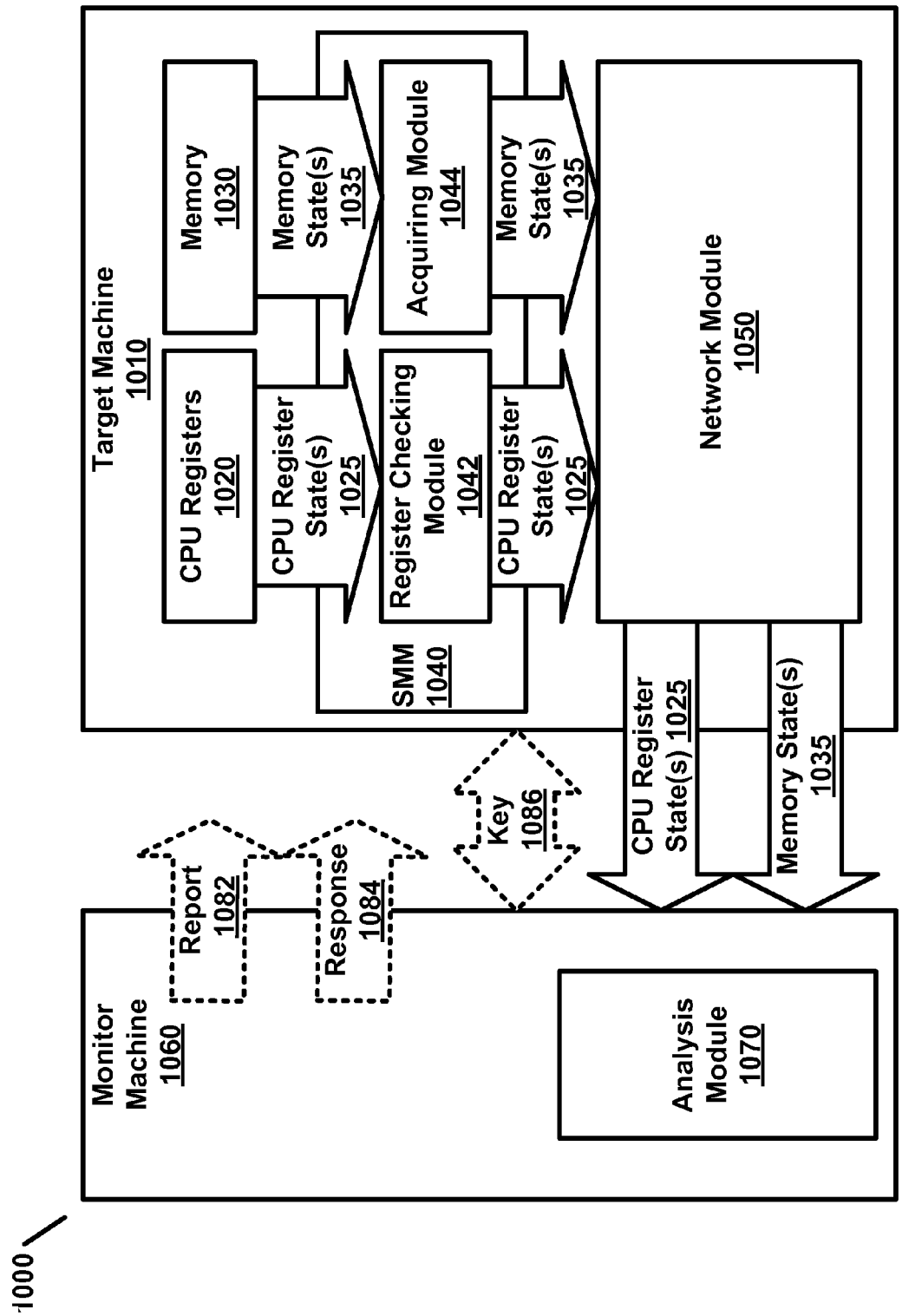
FIG. 10 illustrates a hardware-assisted integrity monitor in accordance with some aspects of embodiments.

Referring to example FIG. 10, a hardware-assisted integrity monitor is illustrated in accordance with some aspects of embodiments. According to some aspects of embodiments, a hardware-assisted integrity monitor may include one or more target machines and/or one or more monitor machines. In one aspect of embodiments, a target machine and/or monitor machine may include one or more processors. In another aspect of embodiments, a processor may include one or more system management modes. As illustrated in some aspects of embodiments in FIG. 10, hardware-assisted integrity monitor 1000 may include target machine 1010 and/or monitor machine 1060.

According to some aspects of embodiments, one or more target machines may include one or more system management modes. As illustrated in some aspects of embodiments in FIG. 10, target machine 1010 may include one or more processors including one or more system management modes SMM 1040. In one aspect of embodiments, one or more system management modes may include one or more register checking modules, one or more acquiring modules and/or one or more network modules.

Referring to FIG. 10, SMM 1040 may include register checking module 1042. In some aspects of embodiment, one or more register checking modules may be configured to determine one or more current CPU register states of one or more CPU registers. As illustrate in some aspects of embodiments in FIG. 10, register checking module 1042 may be configured to determine current CPU register state 1025 of CPU registers 1020. In one aspect of embodiments, instructions executed in SMM mode 1040 may cause CPU register checking module 1042 to perform a process, for example to determine and/or acquire current CPU register state 1025 of CPU registers 1020. In another aspect of embodiments, entering and/or exiting SMM mode 1040 may automatically cause CPU register checking module 1042 to perform a process, for example to determine and/or acquire current CPU register state 1025 of CPU registers 1020.

According to some aspects of embodiments, SMM 1040 may include acquiring module 1044. In some aspects of embodiments, one or more acquiring modules may be configured to determine one or more current memory states of one or more memory registers. As illustrate in some aspects of embodiments in FIG. 10, acquiring module 1044 may be configured to determine current memory state 1035 of memory 1030. In one aspect of embodiments, instructions executed in SMM mode 1040 may cause acquiring module 1044 to perform a process, for example to determine and/or acquire current memory state 1035 of memory registers 1030. In another aspect of embodiments, entering and/or exiting SMM mode 1040 may automatically cause acquiring module 1044 to perform a process, for example to determine and/or acquire current memory state 1035 of memory registers 1030.

According to some aspects of embodiments, one or more processors may employ one or more system management interrupts. In some aspects of embodiments, a system management interrupt may be configured to cause one or more processors to enter a system management mode.

According to some aspects of embodiments, one or more system management modes may include one or more network modules. According to some aspects of embodiments illustrated at FIG. 11, SMM 1040 may include network module 1120. In one aspect of embodiments, a network module and an acquiring module may be integrated. In another aspect of embodiments, a network module may be configured to direct one or more communications of one or more current CPU register states and/or one or more current memory states to one or more monitor machines.

Figure 11:
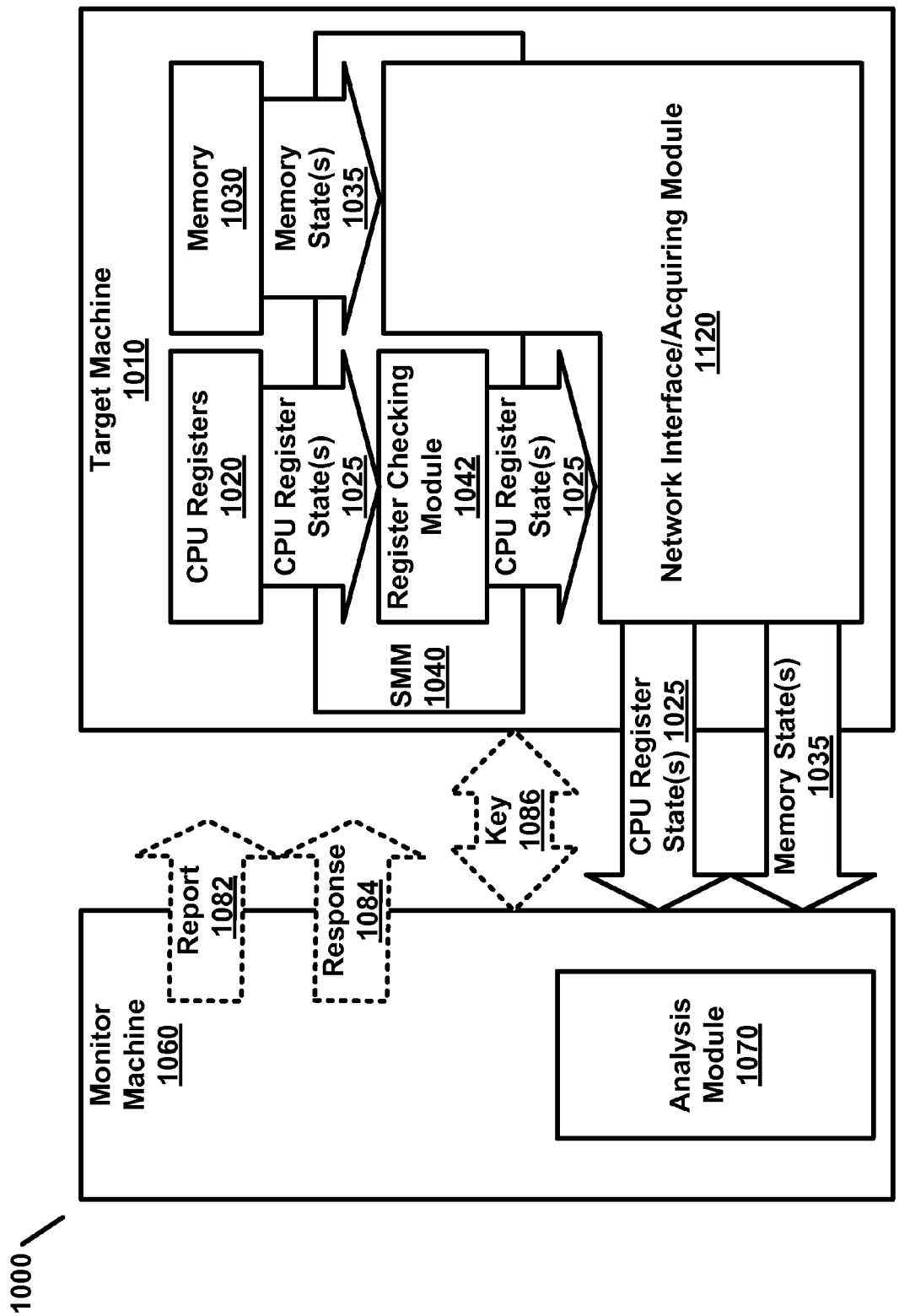
FIG. 11 illustrates a hardware-assisted integrity monitor in accordance with some aspects of embodiments.

Referring to FIG. 10 and FIG. 11, instructions executed in SMM mode 1040 may cause a network module, for example network module 1050 and/or network module 1120, to perform a process, such as direct one or more communications of one or more current CPU register states and/or one or more current memory states to one or more monitor machines. In another aspect of embodiments, entering and/or exiting SMM mode 1040 may automatically cause a network module, for example network module 1050 and/or network module 1120, to perform a process, such as direct one or more communications of one or more current CPU register states and/or one or more current memory states to one or more monitor machines.

According to some aspects of embodiments, one or more network modules may employ one or more network interface cards, for example an Ethernet card. In one aspect of embodiments, a network module may include one or more drivers, for example a driver for an Ethernet card. As illustrated in one aspect of embodiments in FIG. 10, network module 1050 may be configured to direct a communications of current CPU register state 1025 and/or current memory state 1035 to monitor machine 1060.

According to some aspects of embodiments, one or more target machines may include one or more analyzers. In one aspect of embodiments, a target machine may include one or more virtual machine monitors. In embodiments, a virtual machine monitor may include a hypervisor. In another aspect of embodiments, an analyzer may include a network analyzer, for example a network sniffer. In further aspects of embodiments, an analyzer may include any other suitable analyzer, for example one or more Intrusion Detection Systems (IDS), firewalls, and/or the like.

According to some aspects of embodiments, one or more monitor machines may include one or more network modules and/or one or more analysis modules. In one aspect of embodiments, a network module may be configured to receive one or more states, for example a current memory state of one or more memory registers. In embodiments, a current memory state may be determined and/or acquired on one or more target machines employing one or more system management modes. In another aspect of embodiments, a network module may be configured to receive one or more states, for example a current CPU register state of one or more memory registers. In embodiments, a current CPU register state may be determined and/or acquired on one or more target machines employing one or more system management modes.

According to some aspects of embodiments, a monitor machine may include one or more analysis modules. In one aspect of embodiments, an analysis module may be configured to determine memory state differences between one or more current memory states and one or more preexisting memory states. In another aspect of embodiments, an analysis module may be configured to determine CPU register state differences between a current CPU register state and one or more preexisting CPU register states. As illustrated in some aspects of embodiments in FIG. 10, analysis module 1070 may be configured to determine memory state differences between current memory state 1035, for example communicated by target machine 1010, and a preexisting memory state, and/or may be configured to determine CPU register state differences between current CPU register state 1025, for example communicated by target machine 1010, and a preexisting CPU register state.

According to some aspects of embodiments, one or more states may be requested, generated, communicated, and/or analyzed at any time. In one aspects of embodiments, a current memory state, current CPU register state and/or preexisting state may be automatically forwarded to a monitor machine, for example at preselected time intervals. In embodiments, preselected time intervals may include at original state, at boot-up, during operation, prior to a restart, and/or the like. In another aspect of embodiments, a current memory state, current CPU register state and/or preexisting state may be may requested, generated, communicated, and/or analyzed in reply to an instruction. In embodiments, an instruction may be based on any event, for example prior to downloading data, after allowing access to data, proximate a reboot, and/or the like. In further aspects of embodiments, for example, a preexisting memory state and/or preexisting CPU register state of a target machine may include a snapshot of one or more memory registers and/or CPU registers generated and/or acquired at any time, for example prior to acquisition of a current memory state and/or current CPU register state.

According to some aspects of embodiments, one or more states may be stored. In one aspect of embodiments, a state may be stored at a target machine and/or a monitor machine. In another aspect of embodiments, a state may be stored at any suitable storage medium, for example a network server, computer-readable medium, and/or the like. In further aspects of embodiments, a state and/or a request for a state may be communicated directly between a target machine and a monitor machine. In other aspects of embodiments, a state and/or a request for a state may be communicated indirectly through an intermediate storage medium, for example a network server and/or the like. Referring back to FIG. 10, CPU register state 1025 and memory state 1035 may be generated at target machine 1010 and communicated directly to monitor machine 1060.

According to some aspects of embodiments, a monitor machine may be configured to report state differences, for example between a current state and a pre-existing state. In some aspects of embodiments, a monitor machine may include a network module, which may be configured to report memory state differences and/or CPU register state differences. In one aspect of embodiments, a monitor machine may be configured to display a report, for example to an operator. In another aspect of embodiments, a monitor machine may be configured to store a report, and/or communicate a stored report, for example at a preselected interval and/or in reply to a request.

According to some aspects of embodiments, a report may include an alarm, a log, a comparison, a statement of differences, and/or the like. In embodiments, an operator may include a network administrator and/or a management platform, such as HP OpenView, Computer Associates Unicenter, SUN Solstice, and/or the like. In further aspects of embodiments, a monitor machine may be configured to communicate a report to a storage medium. In other aspects of embodiments, a monitor machine may be configured to communicate a report to a an analyzer. As illustrated in some aspects of embodiments in FIG. 10, monitor machine 1060 may be configured to communicate report 1082.

According to some aspects of embodiments, a monitor machine may be configured to initiate a response based upon a difference. In one aspect of embodiments, a monitor machine may be configured to initiate a response based upon CPU register state differences, which may include differences between a current CPU register state and a pre-existing CPU register state. In another aspect of embodiments, a monitor machine may be configured to initiate a response based upon memory state differences, which may include differences between a current memory state and a pre-existing memory state. In further aspects of embodiments, a response may be automatic, for example at preselected intervals and/or in response to a request for a response. In embodiments, a preselected interval may include a selected time after differences are determined, after a request is made for a response, and/or the like.

According to some aspects of embodiments, a response may include isolating a target machine. In one aspect of embodiments, isolating a machine may include causing a target machine to shut down, disabling a network module of a target machine, blocking traffic of a target machine and/or the like. In another aspect of embodiments, a response may include monitoring a target machine to capture further information, for example source/destination addresses, hardware addresses, payload, applications, and/or the like. In further aspects of embodiments, a response may be communicated directly and/or indirectly to any suitable entity, for example to operator, storage medium, intrusion detection system, network analyzer (i.e., sniffer), router, switch, and/or the like.

According to some aspects of embodiments, a target machine and/or a monitor machine may communicate over a relatively secure channel. In one aspect of embodiments, a key may be shared directly and/or indirectly between a target machine and a monitor machine. In embodiments, a secret key may be employed to encrypt and/or decrypt a state, for example a current memory state, a current CPU register state, a preexisting state, and/or the like. In another aspect of embodiments, a target machine may communicate employing any secure process, for example employing a virtual private network, SSH, suitable one-way and two-way cryptographic hash functions such as RSH and SHA, firewalls, access-lists and/or the like. As illustrated in some aspects of embodiments in FIG. 10, key 1086 may be shared between target machine 1010 and monitor machine 1060.

According to some aspects of embodiments, a hardware-assisted integrity monitor may be configured to operate in a virtual environment, physical environment and/or combinations thereof. In one aspect of embodiments, one or more target machines and/or monitor machines may include one or more virtual machines. As illustrated in some aspects of embodiments in example FIG. 12A, FIG. 12C, FIG. 12F and FIG. 12G, target machine 1210 may include a virtual machine. As illustrated in other aspects of embodiments in example FIG. 12B, FIG. 12C, FIG. 12E and FIG. 12G, monitor machine 1260 may include a virtual machine.

Figure 12A:
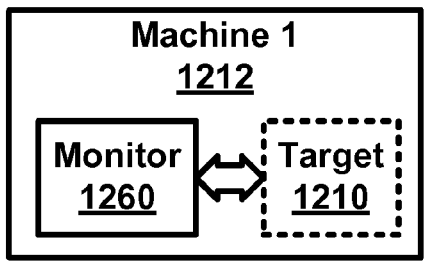
FIG. 12 illustrates a hardware-assisted integrity monitor in accordance with some aspects of embodiments.
Figure 12D:
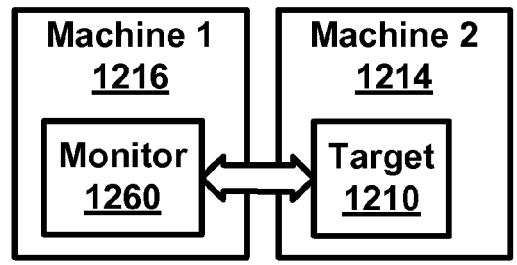
Figure 12B:
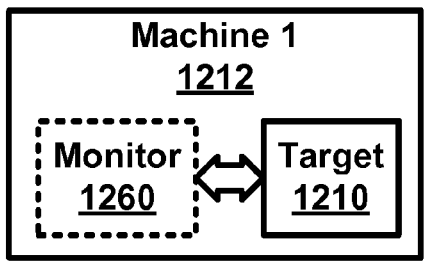
Figure 12E:
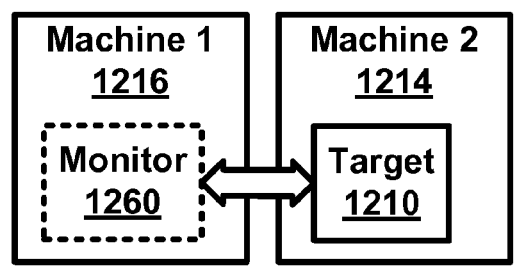
Figure 12C:
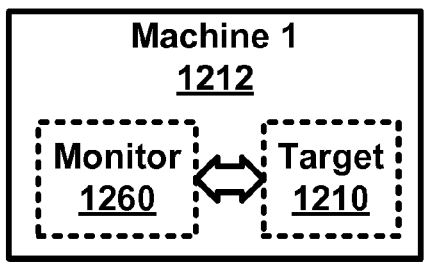
Figure 12F:
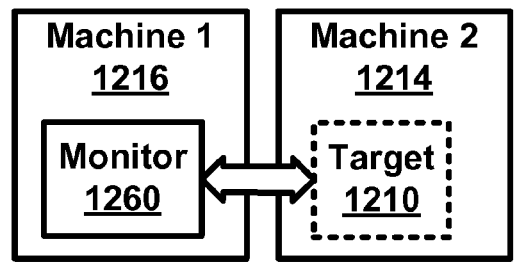
Figure 12G:
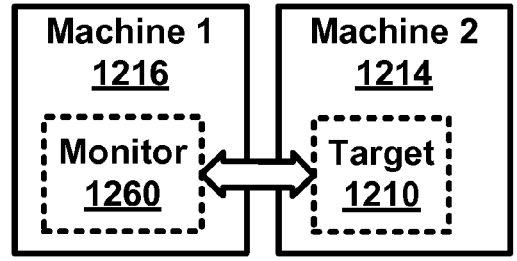

According to some aspects of embodiments, one or more target machines and/or monitor machines may include one or more physical machines. As illustrated in some aspects of embodiments in FIG. 12B, FIG. 12D and FIG. 12E, target machine 1210 may include a physical machine. As illustrated in other aspects of embodiments in FIG. 12A, FIG. 12D, and FIG. 12F, monitor machine 1260 may include a physical machine.

According to some aspects of embodiments, one or more target machines and/or monitor machines may reside on two or more different physical machines. As illustrated in some aspects of embodiments in FIG. 12D, FIG. 12E, FIG. 12F and FIG. 12G, target machine 1210 may reside on physical machine 1214 and monitor machine 1260 may reside on physical machine 1216. In another aspect of embodiments, one or more target machines and/or monitor machines may reside on the same physical machine. As illustrated in some aspects of embodiments in FIG. 12A, FIG. 12B and FIG. 12C, target machine 1210 and monitor machine 1260 may reside on physical machines 1012.

Figure 13A:
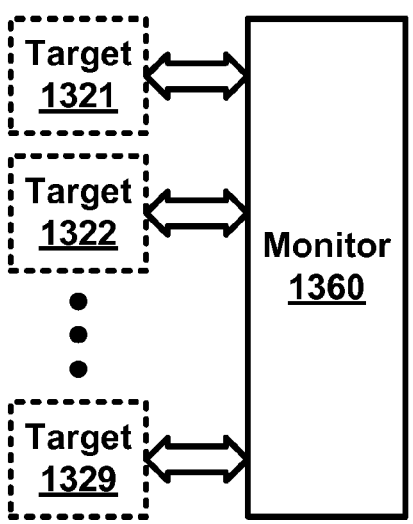
FIG. 13 illustrates a hardware-assisted integrity monitor in accordance with some aspects of embodiments.
Figure 13B:
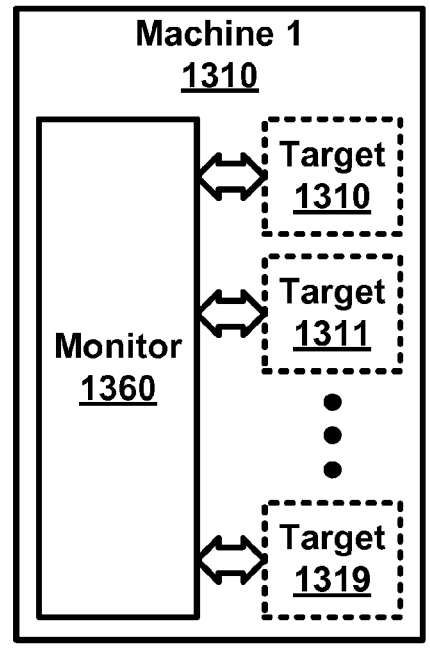
Figure 13C:
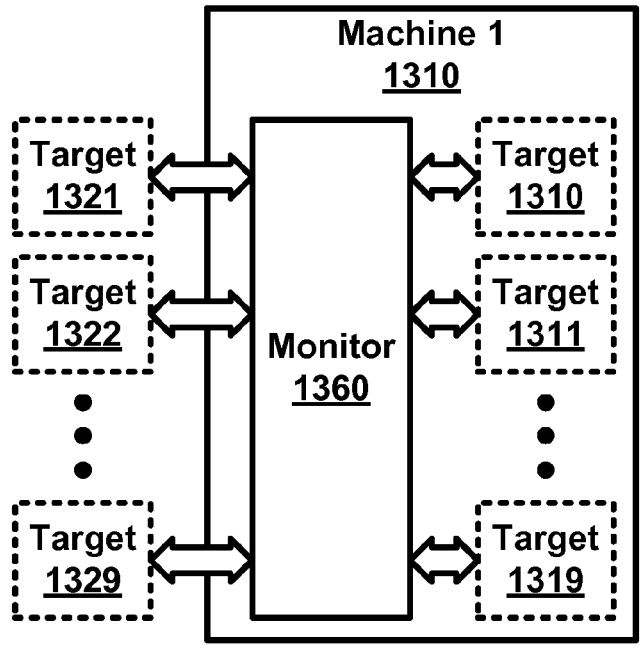

Referring to example FIG. 13A, FIG. 13B and FIG. 13C, a hardware-assisted integrity monitor is illustrated in accordance with some aspects of embodiments. As illustrated in one aspect of embodiments in FIG. 13A, FIG. 13B and FIG. 13C, target machines 1310, 1311 . . . 1319 and 1321, 1322 . . . 1329 may include a virtual machine. In embodiments, monitor machine 1360 may include a physical machine. As illustrated in another aspect of embodiments in FIG. 13B and FIG. 13C, target machines 1310, 1311 . . . 1319 and monitor machine 1360 may reside on physical machine 1312. As illustrated in further aspects of embodiments in FIG. 13A and FIG. 13C, target machines 1321, 1322 . . . 1329 and monitor machine 1360 may reside on two or more different physical machines.

According to some aspects of embodiments, one or more computer readable medium may contain a series of computer readable instructions. In one aspect of embodiments, a series of instructions may include a series of system management mode computer readable instructions. In embodiments, a series of system management mode computer readable instructions may include an instruction employed in one or more system management modes.

According to some aspects of embodiments, a series of computer readable instructions may be configured to cause one or more processors to perform a process. In one aspect of embodiments, a process may include determining one or more current CPU register states of one or more CPU registers. In another aspect of embodiments, a process may include determining one or more current memory states of one or more memory registers. In further aspects of embodiments, a process may include communicating one or more current CPU register states and/or one or more current memory states, for example to one or more monitor machines.

According to some aspects of embodiments, a series of computer readable instructions may be configured to cause one or more processors to perform a process, which may include determining memory state differences between one or more current memory states, for example communicated by a target machine, and one or more preexisting memory states. In another aspect of embodiments, a process may include determining one or more CPU register state differences between one or more current CPU register states, for example communicated by a target machine, and one or more preexisting CPU register states.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, punched cards and paper tapes, optical disks, barcodes, magnetic ink characters and/or the like.

The disclosure of this patent document may incorporate material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

As one non-limiting example, it should be noted that the above explanation has focused on the example(s), such as computer readable medium containing a series of instructions configured to cause one or more processors to perform a process of determining and/or communicating. However, one skilled in the art will recognize that embodiments of the invention could include one or more processors to perform any process, for example communicating a key, employing an interrupt, communicating states, employing NIC's and/or drivers, employing physical and/or virtual environments, reporting, responding, replying, and/or the like. As another non-limiting example, FIG. 12A to FIG. 12G and FIG. 13A to FIG. 13C illustrates a combination of physical and virtual machines, residing on the same and different machine. However, one skilled in the art will recognize that embodiments of the invention could include any desired combination of physical and virtual machines, residing on the same or different machines. As a final non-limiting example, Xen hypervisor and/or Windows operating systems noted above are only examples, and other hypervisors and operating systems may be employed, such as HP's Integrity VM, IBM's Power VM, and/or other operating systems such as Android, Simbian, Backburry OS, iOS, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps described and/or the data flow listed in any figures may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A target machine comprising one or more processors having a system management mode, the target machine including:
   at least one register checking module configured to determine a current CPU register state of at least one CPU register while in a system management mode session;
   at least one acquiring module configured to determine a current memory state of at least one memory register while in the same system management mode session without leaving the system management mode session; and
   at least one network module configured to direct a communication of the current CPU register state and the current memory state to a monitor machine while in the same system management mode session without leaving the system management mode session.

2. The target machine according to claim 1, wherein the monitor machine is configured to:
   determine memory state differences between the current memory state communicated by the target machine and a preexisting memory state; and
   determine CPU register state differences between the current CPU register state communicated by the target machine and a preexisting CPU register state.

3. The target machine according to claim 2, wherein the monitor machine is further configured to:
   report the memory state differences; and
   report the CPU register state differences.

4. The target machine according to claim 2, wherein the monitor machine is further configured to initiate a response based upon at least one of the following:
   the memory state differences; and
   the CPU register state differences.

5. The target machine according to claim 1, wherein at least one of the target machine and the monitor machine comprises a virtual machine.

6. The target machine according to claim 1, wherein at least one of the target machine and the monitor machine comprises a physical machine.

7. The target machine according to claim 1, wherein the target machine and the monitor machine reside on two different physical machines.

8. The target machine according to claim 1, wherein the target machine and the monitor machine reside on the same physical machine.

9. The target machine according to claim 1, wherein a secret key is shared between the monitor machine and the target machine.

10. The target machine according to claim 1, wherein a secret key is employed to at least one of encrypt and decrypt at least one of the following:
    current memory state;
    the current CPU register state; and
    combinations thereof.

11. The target machine according to claim 1, wherein the network module employs a network interface card.

12. The target machine according to claim 1, wherein the network module comprises a driver.

13. The target machine according to claim 1, wherein the network module and the acquiring module are integrated.

14. The target machine according to claim 1, wherein the target machine further includes a virtual machine monitor.

15. The target machine according to claim 1, wherein a system management interrupt causes at least one of the one or more processors to enter system management mode.

16. A monitor machine comprising one or more processors, the monitor machine including:
    a network module configured to:
      receive a current memory state of at least one memory register acquired on a target machine operating in a system management mode session;
      receive a current CPU register state of at least one CPU register acquired on a target machine operating in the same system management mode session without leaving the system management mode session; and
      transmit the current memory state and the current CPU register state from the target machine operating in the same system management mode session without leaving the system management mode session; and at least one analysis module configured to:
  determine memory state differences between the current memory state and a preexisting memory state of the target machine; and
  determine CPU register state differences between the current CPU register state and a preexisting CPU register state of the target machine.

17. The monitor machine according to claim 16, wherein the network module is configured to report the memory state differences and the CPU register state differences.

18. The monitor machine according to claim 16, wherein the preexisting memory state of the target machine comprises a snapshot of at least one memory register prior to acquisition of the current memory state.

19. The monitor machine according to claim 16, wherein the preexisting CPU register state of the target machine comprises a snapshot of at least one CPU register prior to acquisition of the current CPU register state.

20. A non-transitory computer readable medium containing a series of system management mode computer readable instructions configured to cause one or more processors to perform a process comprising:
  entering a system management mode session;
  determining a current CPU register state of at least one CPU register while in the same system management mode session without leaving the system management mode session;
  determining a current memory state of at least one memory register while in the same system management mode session without leaving the system management mode session; and
  communicating the current CPU register state and the current memory state to a monitor machine while in the system management mode session.

21. The non-transitory computer readable medium according to claim 20 which further causes the one or more processors to perform a process comprising:
  determining memory state differences between the current memory state communicated by the target machine and a preexisting memory state; and
  determining CPU register state differences between the current CPU register state communicated by the target machine and a preexisting CPU register state.

\* \* \* \* \*